(12) United States Patent
Baek et al.

(10) Patent No.: US 12,069,504 B2
(45) Date of Patent: Aug. 20, 2024

(54) METHOD AND APPARATUS FOR TRANSMITTING AND RECEIVING PROTOCOL DATA UNIT-RELATED INFORMATION IN WIRELESS LAN SYSTEM

(71) Applicant: LG ELECTRONICS INC., Seoul (KR)

(72) Inventors: Sunhee Baek, Seoul (KR); Insun Jang, Seoul (KR); Jinsoo Choi, Seoul (KR); Jiin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/428,750

(22) Filed: Jan. 31, 2024

(65) Prior Publication Data

US 2024/0179558 A1 May 30, 2024

Related U.S. Application Data

(63) Continuation of application No. PCT/KR2022/013654, filed on Sep. 13, 2022.

(30) Foreign Application Priority Data

Sep. 13, 2021 (KR) .......... 10-2021-0121896

(51) Int. Cl.
*H04W 28/02* (2009.01)
*H04W 84/12* (2009.01)

(52) U.S. Cl.
CPC ........ *H04W 28/0221* (2013.01); *H04W 84/12* (2013.01)

(58) Field of Classification Search
CPC .............................. H04W 28/12; H04W 84/12
See application file for complete search history.

(56) References Cited

U.S. PATENT DOCUMENTS

2013/0136016 A1* 5/2013 Lee .......... H04L 45/00 370/255
2015/0249936 A1* 9/2015 Chen ...... H04L 1/0006 370/329

(Continued)

FOREIGN PATENT DOCUMENTS

KR  10-2013-0045386   5/2013
WO     2016-175439    11/2016

OTHER PUBLICATIONS

PCT International Application No. PCT/KR2022/013654, International Search Report dated Dec. 13, 2022, 4 pages.

(Continued)

*Primary Examiner* — Mohammad S Anwar
(74) *Attorney, Agent, or Firm* — LEE, HONG, DEGERMAN, KANG & WAIMEY

(57) ABSTRACT

Disclosed are a method and an apparatus for transmitting and receiving protocol data unit (PDU)-related information in a wireless LAN system. The method by which a first station (STA) transmits an aggregate-medium access control (MAC) protocol data unit (PDU) (A-MPDU) in a wireless LAN system, according to an embodiment of the present disclosure, may comprise the steps of: receiving, from a second STA, one or more of first information, second information, and third information related to the maximum length for the A-MPDU; and transmitting, to the second STA, an A-MPDU having a length less than or equal to the maximum length for the A-MPDU, which is derived from a first type physical layer PDU (PPDU) on the basis of the first information, the second information, and the third information.

9 Claims, 16 Drawing Sheets

(56) References Cited

U.S. PATENT DOCUMENTS

2018/0048503 A1\* 2/2018 Kim ................. H04L 27/26
2019/0364555 A1 11/2019 Huang et al.

OTHER PUBLICATIONS

GAN, "MAC CR for subclause 9.4.2," IEEE 802.11-19/0745r1, May 2019, 8 pages.

Lee et al., "A-MPDU aggregation with optimal number of MPDUs for delay requirements in IEEE 802.11ac," PLoS ONE 14(3), e0213888, Mar. 2019, 17 pages.

\* cited by examiner

| B0 | B1 | B2 | B3 | B4 | B5  B15 |
|---|---|---|---|---|---|
| NSEP Priority Access Supported | EHT OM Control Support | Triggered TXOP Sharing Support | Restricted TWT Support | SCS Traffic Description Support | Reserved |
| 1 | 1 | 1 | 1 | 1 | 11 |

Bits:

(b)

| B0 | B1 | B2 | B3 | B4 | B5 | B6  B15 |
|---|---|---|---|---|---|---|
| NSEP Priority Access Supported | EHT OM Control Support | Triggered TXOP Sharing Support | Restricted TWT Support | SCS Traffic Description Support | Maximum A-MPDU Length Exponent Extension | Reserved |
| 1 | 1 | 1 | 1 | 1 | 1 | 10 |

Bits:

(c)

| B0 | B1 | B2 | B3 | B4 | B5  B7 | B8  B15 |
|---|---|---|---|---|---|---|
| NSEP Priority Access Supported | EHT OM Control Support | Triggered TXOP Sharing Support | Restricted TWT Support | SCS Traffic Description Support | Maximum A-MPDU Length Exponent Extension | Reserved |
| 1 | 1 | 1 | 1 | 1 | 3 | 8 |

Bits:

METHOD AND APPARATUS FOR TRANSMITTING AND RECEIVING PROTOCOL DATA UNIT-RELATED INFORMATION IN WIRELESS LAN SYSTEM

CROSS-REFERENCE TO RELATED APPLICATIONS

This application is a continuation of International Application No. PCT/KR2022/013654, filed on Sep. 13, 2022, which claims the benefit of earlier filing date and right of priority to Korean Application No. 10-2021-0121896, filed on Sep. 13, 2021, the contents of which are all hereby incorporated by reference herein in their entireties.

TECHNICAL FIELD

The present disclosure relates to a method and a device for transmitting or receiving protocol data unit (PDU)-related information in a wireless local area network (WLAN) system.

BACKGROUND

New technologies for improving transmission rates, increasing bandwidth, improving reliability, reducing errors, and reducing latency have been introduced for a wireless LAN (WLAN). Among WLAN technologies, an Institute of Electrical and Electronics Engineers (IEEE) 802.11 series standard may be referred to as Wi-Fi. For example, technologies recently introduced to WLAN include enhancements for Very High-Throughput (VHT) of the 802.11ac standard, and enhancements for High Efficiency (HE) of the IEEE 802.11ax standard.

In order to provide a more improved wireless communication environment, an enhancement technologies for EHT (Extremely High Throughput) are being discussed. For example, technologies for multiple access point (AP) coordination and multiple input multiple output (MIMO) supporting an increased bandwidth, efficient utilization of multiple bands and increased spatial streams are being studied, and, in particular, various technologies for supporting low latency or real-time traffic are being studied.

SUMMARY

A technical problem of the present disclosure is to provide a method and a device for transmitting or receiving protocol data unit (PDU)-related information in a WLAN system.

An additional technical problem of the present disclosure is to provide a method and a device for transmitting or receiving information related to an A-MPDU length in a WLAN system supporting an aggregate-MAC PDU (A-MPDU) of an increased length.

The technical objects to be achieved by the present disclosure are not limited to the above-described technical objects, and other technical objects which are not described herein will be clearly understood by those skilled in the pertinent art from the following description.

A method for transmitting an A-MPDU (aggregate-medium access control (MAC) protocol data unit (PDU)) by a first station (STA) in a WLAN system according to an aspect of the present disclosure includes receiving, from a second STA, at least one of first information, second information, or third information related to a maximum length for the A-MPDU, and transmitting, to the second STA, in a first type physical layer PDU (PPDU), an A-MPDU having a length equal to or smaller than the maximum length for the A-MPDU derived based on the first information, the second information, and the third information.

A method for receiving an A-MPDU (aggregate-medium access control (MAC) protocol data unit (PDU)) by a second station (STA) in a WLAN system according to an additional aspect of the present disclosure includes transmitting, to a first STA, at least one of first information, second information, or third information related to a maximum length for the A-MPDU, and receiving, from the first STA, in a first type physical layer PDU (PPDU), an A-MPDU having a length equal to or smaller than the maximum length for the A-MPDU derived based on the first information, the second information, and the third information.

According to the present disclosure, a method and a device for transmitting or receiving protocol data unit (PDU)-related information in a WLAN system may be provided.

According to the present disclosure, a method and a device for transmitting or receiving information related to an A-MPDU length in a WLAN system supporting an aggregate-MAC PDU (A-MPDU) of an increased length may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

The accompanying drawings, which are included as part of the detailed description to aid understanding of the present disclosure, provide embodiments of the present disclosure and together with the detailed description describe technical features of the present disclosure.

FIG. 15 is a diagram showing illustrative formats of an EHT MAC capability information field according to the present disclosure.

DETAILED DESCRIPTION

Figure 1:
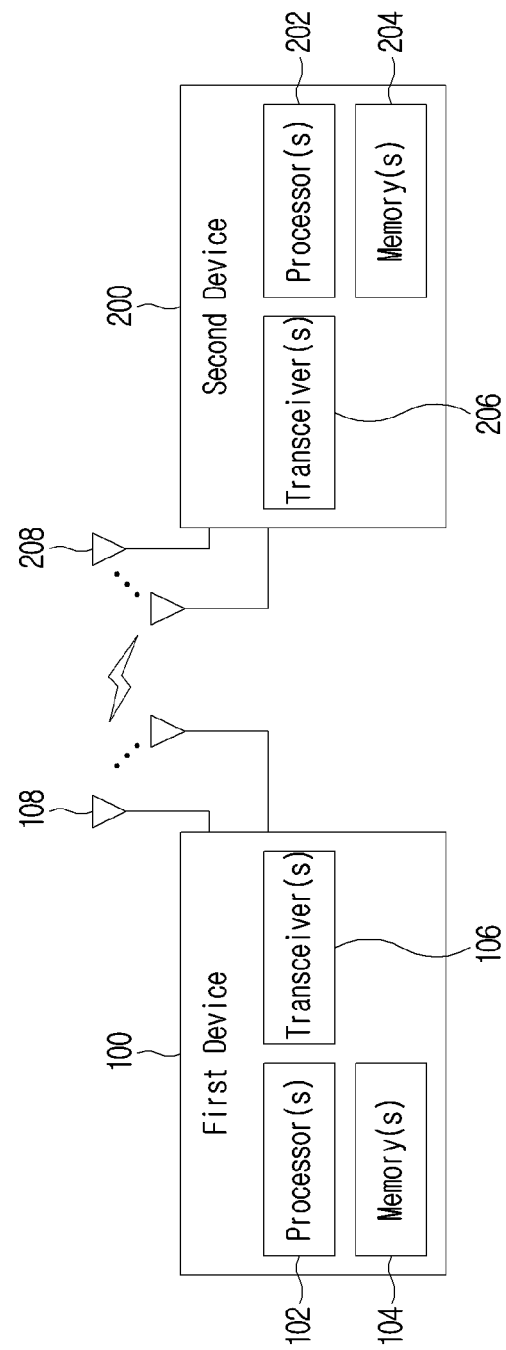
FIG. 1 illustrates a block configuration diagram of a wireless communication device according to an embodiment of the present disclosure.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

Examples of the present disclosure may be applied to various wireless communication systems. For example, examples of the present disclosure may be applied to a wireless LAN system. For example, examples of the present disclosure may be applied to an IEEE 802.11a/g/n/ac/ax standards-based wireless LAN. Furthermore, examples of the present disclosure may be applied to a wireless LAN based on the newly proposed IEEE 802.11be (or EHT) standard. Examples of the present disclosure may be applied to an IEEE 802.11be Release-2 standard-based wireless LAN corresponding to an additional enhancement technology of the IEEE 802.11be Release-1 standard. Additionally, examples of the present disclosure may be applied to a next-generation standards-based wireless LAN after IEEE 802.11be. Further, examples of this disclosure may be applied to a cellular wireless communication system. For example, it may be applied to a cellular wireless communication system based on Long Term Evolution (LTE)-based technology and 5G New Radio (NR)-based technology of the 3rd Generation Partnership Project (3GPP) standard.

Hereinafter, technical features to which examples of the present disclosure may be applied will be described.

FIG. 1 illustrates a block diagram of a wireless communication device according to an embodiment of the present disclosure.

The first device 100 and the second device 200 illustrated in FIG. 1 may be replaced with various terms such as a terminal, a wireless device, a Wireless Transmit Receive Unit (WTRU), an User Equipment (UE), a Mobile Station (MS), an user terminal (UT), a Mobile Subscriber Station (MSS), a Mobile Subscriber Unit (MSU), a subscriber station (SS), an advanced mobile station (AMS), a wireless terminal (WT), or simply user, etc. In addition, the first device 100 and the second device 200 include an access point (AP), a base station (BS), a fixed station, a Node B, a base transceiver system (BTS), a network, It may be replaced with various terms such as an Artificial Intelligence (AI) system, a road side unit (RSU), a repeater, a router, a relay, and a gateway.

The devices 100 and 200 illustrated in FIG. 1 may be referred to as stations (STAs). For example, the devices 100 and 200 illustrated in FIG. 1 may be referred to by various terms such as a transmitting device, a receiving device, a transmitting STA, and a receiving STA. For example, the STAs 110 and 200 may perform an access point (AP) role or a non-AP role. That is, in the present disclosure, the STAs 110 and 200 may perform functions of an AP and/or a non-AP. When the STAs 110 and 200 perform an AP function, they may be simply referred to as APs, and when the STAs 110 and 200 perform non-AP functions, they may be simply referred to as STAs. In addition, in the present disclosure, an AP may also be indicated as an AP STA.

Referring to FIG. 1, the first device 100 and the second device 200 may transmit and receive radio signals through various wireless LAN technologies (e.g., IEEE 802.11 series). The first device 100 and the second device 200 may include an interface for a medium access control (MAC) layer and a physical layer (PHY) conforming to the IEEE 802.11 standard.

In addition, the first device 100 and the second device 200 may additionally support various communication standards (e.g., 3GPP LTE series, 5G NR series standards, etc.) technologies other than wireless LAN technology. In addition, the device of the present disclosure may be implemented in various devices such as a mobile phone, a vehicle, a personal computer, augmented reality (AR) equipment, and virtual reality (VR) equipment, etc. In addition, the STA of the present specification may support various communication services such as a voice call, a video call, data communication, autonomous-driving, machine-type communication (MTC), machine-to-machine (M2M), device-to-device (D2D), IoT (Internet-of-Things), etc.

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including instructions for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless LAN technology (e.g., IEEE 802.11 series). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including instructions for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless LAN technology (e.g., IEEE 802.11 series). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC). One or more processors 102, 202 may generate one or more PDUs (Protocol Data Unit) and/or one or more SDUs (Service Data Unit) according to description, functions, procedures, proposals, methods and/or operation flow charts disclosed in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, an instruction and/or a set of instructions.

One or more memories 104, 204 may be connected to one or more processors 102, 202 and may store data, a signal, a message, information, a program, a code, an indication and/or an instruction in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

For example, one of the STAs 100 and 200 may perform an intended operation of an AP, and the other of the STAs 100 and 200 may perform an intended operation of a non-AP STA. For example, the transceivers 106 and 206 of FIG. 1 may perform a transmission and reception operation of a signal (e.g., a packet or a physical layer protocol data unit (PPDU) conforming to IEEE 802.11a/b/g/n/ac/ax/be). In addition, in the present disclosure, an operation in which various STAs generate transmission/reception signals or perform data processing or calculation in advance for transmission/reception signals may be performed by the processors 102 and 202 of FIG. 1. For example, an example of an operation of generating a transmission/reception signal or performing data processing or calculation in advance for the transmission/reception signal may include 1) Determining/acquiring/configuring/calculating/decoding/encoding bit information of fields (signal (SIG), short training field (STF), long training field (LTF), Data, etc.) included in the PPDU, 2) Determining/configuring/acquiring time resources or frequency resources (e.g., subcarrier resources) used for fields (SIG, STF, LTF, Data, etc.) included in the PPDU; 3) Determining/configuring/acquiring a specific sequence (e.g., pilot sequence, STF/LTF sequence, extra sequence applied to SIG) used for fields (SIG, STF, LTF, Data, etc.) included in the PPDU action, 4) power control operation and/or power saving operation applied to the STA, 5) Operations related to ACK signal determination/acquisition/configuration/calculation/decoding/encoding, etc. In addition, in the following example, various information (e.g., information related to fields/subfields/control fields/parameters/power, etc.) used by various STAs to determine/acquire/configure/calculate/decode/encode transmission and reception signals may be stored in the memories 104 and 204 of FIG. 1.

Hereinafter, downlink (DL) may mean a link for communication from an AP STA to a non-AP STA, and a DL PPDU/packet/signal may be transmitted and received through the DL. In DL communication, a transmitter may be part of an AP STA, and a receiver may be part of a non-AP STA. Uplink (UL) may mean a link for communication from non-AP STAs to AP STAs, and a UL PPDU/packet/signal may be transmitted and received through the UL. In UL communication, a transmitter may be part of a non-AP STA, and a receiver may be part of an AP STA.

Figure 2:
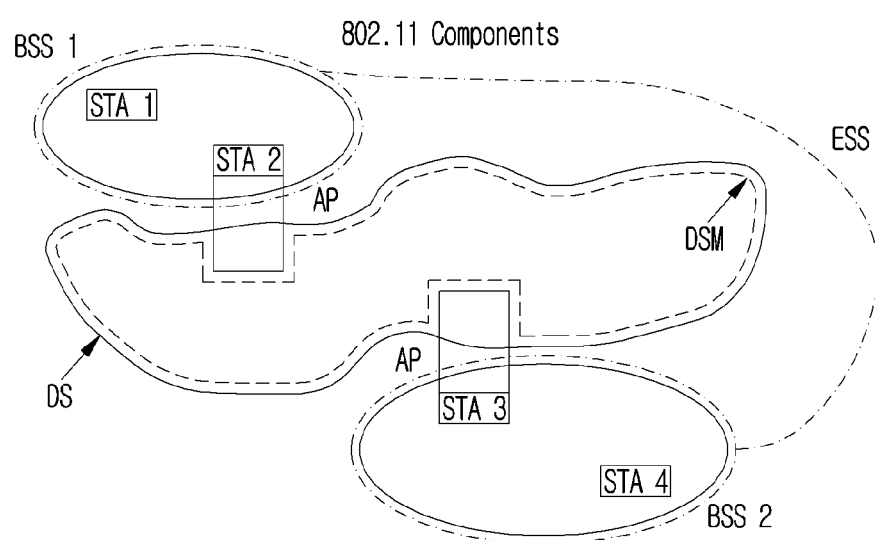
FIG. 2 is a diagram illustrating an exemplary structure of a WLAN system to which the present disclosure may be applied.

FIG. 2 is a diagram illustrating an exemplary structure of a wireless LAN system to which the present disclosure may be applied.

The structure of the wireless LAN system may consist of be composed of a plurality of components. A wireless LAN supporting STA mobility transparent to an upper layer may be provided by interaction of a plurality of components. A Basic Service Set (BSS) corresponds to a basic construction block of a wireless LAN. FIG. 2 exemplarily shows that two BSSs (BSS1 and BSS2) exist and two STAs are included as members of each BSS (STA1 and STA2 are included in BSS1, and STA3 and STA4 are included in BSS2). An ellipse representing a BSS in FIG. 2 may also be understood as representing a coverage area in which STAs included in the corresponding BSS maintain communication. This area may be referred to as a Basic Service Area (BSA). When an STA moves out of the BSA, it may not directly communicate with other STAs within the BSA.

If the DS shown in FIG. 2 is not considered, the most basic type of BSS in a wireless LAN is an independent BSS (IBSS). For example, IBSS may have a minimal form containing only two STAs. For example, assuming that other components are omitted, BSS1 containing only STA1 and STA2 or BSS2 containing only STA3 and STA4 may respectively correspond to representative examples of IBSS. This configuration is possible when STAs may communicate directly without an AP. In addition, in this type of wireless LAN, it is not configured in advance, but may be configured when a LAN is required, and this may be referred to as an ad-hoc network. Since the IBSS does not include an AP, there is no centralized management entity. That is, in IBSS, STAs are managed in a distributed manner. In IBSS, all STAs may be made up of mobile STAs, and access to the distributed system (DS) is not allowed, forming a self-contained network.

Membership of an STA in the BSS may be dynamically changed by turning on or off the STA, entering or exiting the BSS area, and the like. To become a member of the BSS, the STA may join the BSS using a synchronization process. In order to access all services of the BSS infrastructure, the STA shall be associated with the BSS. This association may be dynamically established and may include the use of a Distribution System Service (DSS).

A direct STA-to-STA distance in a wireless LAN may be limited by PHY performance. In some cases, this distance limit may be sufficient, but in some cases, communication between STAs at a longer distance may be required. A distributed system (DS) may be configured to support extended coverage.

DS means a structure in which BSSs are interconnected. Specifically, as shown in FIG. 2, a BSS may exist as an extended form of a network composed of a plurality of BSSs. DS is a logical concept and may be specified by the characteristics of Distributed System Media (DSM). In this regard, a wireless medium (WM) and a DSM may be logically separated. Each logical medium is used for a different purpose and is used by different components. These medium are not limited to being the same, nor are they limited to being different. In this way, the flexibility of the wireless LAN structure (DS structure or other network structure) may be explained in that a plurality of media are logically different. That is, the wireless LAN structure may be implemented in various ways, and the corresponding wireless LAN structure may be independently specified by the physical characteristics of each embodiment.

A DS may support a mobile device by providing seamless integration of a plurality of BSSs and providing logical services necessary to address an address to a destination. In addition, the DS may further include a component called a portal that serves as a bridge for connection between the wireless LAN and other networks (e.g., IEEE 802.X).

The AP enables access to the DS through the WM for the associated non-AP STAs, and means an entity that also has the functionality of an STA. Data movement between the BSS and the DS may be performed through the AP. For example, STA2 and STA3 shown in FIG. 2 have the functionality of STAs, and provide a function allowing the associated non-AP STAs (STA1 and STA4) to access the DS. In addition, since all APs basically correspond to STAs, all APs are addressable entities. The address used by the AP for communication on the WM and the address used by the AP for communication on the DSM are not necessarily the same. A BSS composed of an AP and one or more STAs may be referred to as an infrastructure BSS.

Data transmitted from one of the STA(s) associated with an AP to a STA address of the corresponding AP may be always received on an uncontrolled port and may be processed by an IEEE 802.1X port access entity. In addition, when a controlled port is authenticated, transmission data (or frames) may be delivered to the DS.

In addition to the structure of the DS described above, an extended service set (ESS) may be configured to provide wide coverage.

An ESS means a network in which a network having an arbitrary size and complexity is composed of DSs and BSSs. The ESS may correspond to a set of BSSs connected to one DS. However, the ESS does not include the DS. An ESS network is characterized by being seen as an IBSS in the Logical Link Control (LLC) layer. STAs included in the ESS may communicate with each other, and mobile STAs may move from one BSS to another BSS (within the same ESS) transparently to the LLC. APs included in one ESS may have the same service set identification (SSID). The SSID is distinguished from the BSSID, which is an identifier of the BSS.

The wireless LAN system does not assume anything about the relative physical locations of BSSs, and all of the following forms are possible. BSSs may partially overlap, which is a form commonly used to provide continuous coverage. In addition, BSSs may not be physically connected, and logically there is no limit on the distance between BSSs. In addition, the BSSs may be physically located in the same location, which may be used to provide redundancy. In addition, one (or more than one) IBSS or ESS networks may physically exist in the same space as one (or more than one) ESS network. When an ad-hoc network operates in a location where an ESS network exists, when physically overlapping wireless networks are configured by different organizations, or when two or more different access and security policies are required in the same location, this may correspond to the form of an ESS network in the like.

Figure 3:
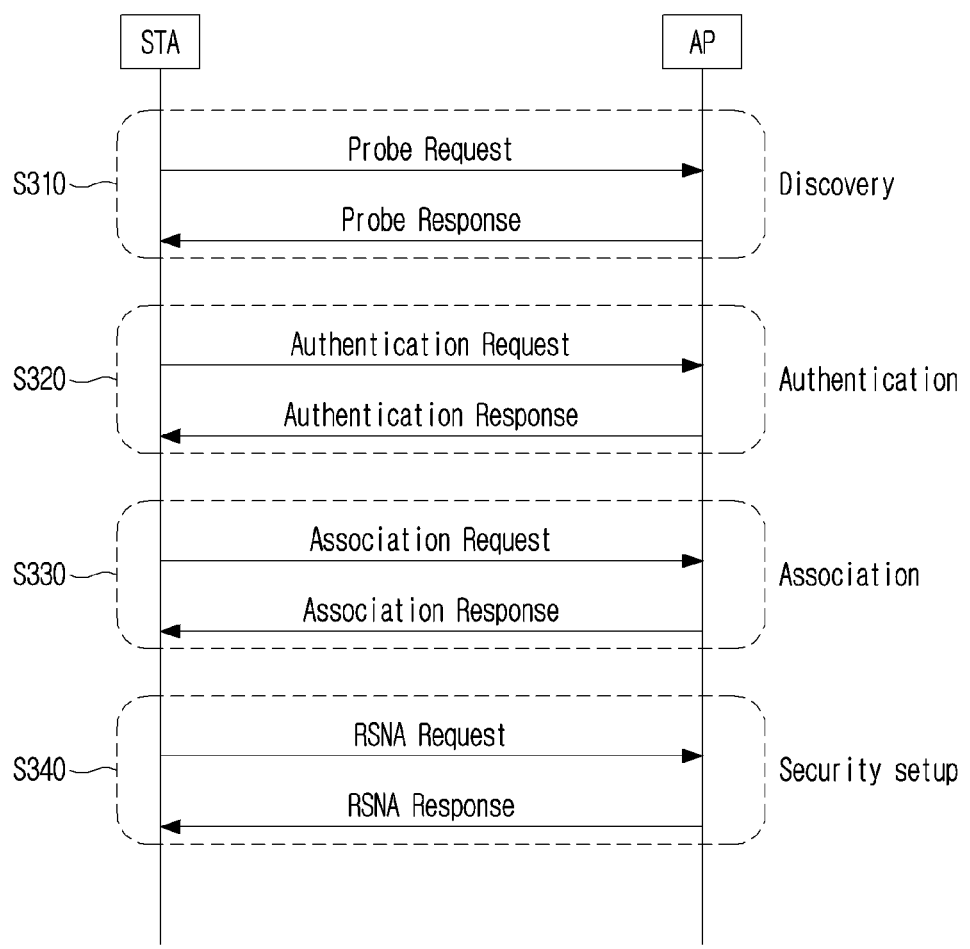
FIG. 3 is a diagram for explaining a link setup process to which the present disclosure may be applied.

FIG. 3 is a diagram for explaining a link setup process to which the present disclosure may be applied.

In order for an STA to set up a link with respect to a network and transmit/receive data, it first discovers a network, performs authentication, establishes an association, and need to perform the authentication process for security. The link setup process may also be referred to as a session initiation process or a session setup process. In addition, the processes of discovery, authentication, association, and security setting of the link setup process may be collectively referred to as an association process.

In step S310, the STA may perform a network discovery operation. The network discovery operation may include a scanning operation of the STA. That is, in order for the STA to access the network, it needs to find a network in which it can participate. The STA shall identify a compatible network before participating in a wireless network, and the process of identifying a network existing in a specific area is called scanning.

Scanning schemes include active scanning and passive scanning. FIG. 3 exemplarily illustrates a network discovery operation including an active scanning process. In active scanning, an STA performing scanning transmits a probe request frame to discover which APs exist around it while moving channels and waits for a response thereto. A responder transmits a probe response frame as a response to the probe request frame to the STA that has transmitted the probe request frame. Here, the responder may be an STA that last transmitted a beacon frame in the BSS of the channel being scanned. In the BSS, since the AP transmits the beacon frame, the AP becomes a responder, and in the IBSS, the STAs in the IBSS rotate to transmit the beacon frame, so the responder is not constant. For example, a STA that transmits a probe request frame on channel 1 and receives a probe response frame on channel 1, may store BSS-related information included in the received probe response frame and may move to the next channel (e.g., channel 2) and perform scanning (i.e., transmission/reception of a probe request/response on channel 2) in the same manner.

Although not shown in FIG. 3, the scanning operation may be performed in a passive scanning manner. In passive scanning, a STA performing scanning waits for a beacon frame while moving channels. The beacon frame is one of the management frames defined in IEEE 802.11, and is periodically transmitted to notify the existence of a wireless network and to allow the STA performing scanning to find a wireless network and participate in the wireless network. In the BSS, the AP serves to transmit beacon frames periodically, and in the IBSS, STAs within the IBSS rotate to transmit beacon frames. When the STA performing scanning receives a beacon frame, the STA stores information for the BSS included in the beacon frame and records beacon frame information in each channel while moving to another channel. The STA receiving the beacon frame may store BSS-related information included in the received beacon frame, move to the next channel, and perform scanning in the next channel in the same way. Comparing active scanning and passive scanning, active scanning has an advantage of having less delay and less power consumption than passive scanning.

After the STA discovers the network, an authentication process may be performed in step S320. This authentication process may be referred to as a first authentication process in order to be clearly distinguished from the security setup operation of step S340 to be described later.

The authentication process includes a process in which the STA transmits an authentication request frame to the AP, and in response to this, the AP transmits an authentication response frame to the STA. An authentication frame used for authentication request/response corresponds to a management frame.

The authentication frame includes an authentication algorithm number, an authentication transaction sequence number, a status code, a challenge text, a robust security network (RSN), and a Finite Cyclic Group, etc. This corresponds to some examples of information that may be included in the authentication request/response frame, and may be replaced with other information or additional information may be further included.

The STA may transmit an authentication request frame to the AP. The AP may determine whether to allow authentication of the corresponding STA based on information included in the received authentication request frame. The AP may provide the result of the authentication process to the STA through an authentication response frame.

After the STA is successfully authenticated, an association process may be performed in step S330. The association process includes a process in which the STA transmits an association request frame to the AP, and in response, the AP transmits an association response frame to the STA.

For example, the association request frame may include information related to various capabilities, a beacon listen interval, a service set identifier (SSID), supported rates, supported channels, RSN, mobility domain, supported operating classes, Traffic Indication Map Broadcast request (TIM broadcast request), interworking service capability, etc. For example, the association response frame may include information related to various capabilities, status code, association ID (AID), supported rates, enhanced distributed channel access (EDCA) parameter set, received channel power indicator (RCPI), received signal to noise indicator (RSNI), mobility domain, timeout interval (e.g., association comeback time), overlapping BSS scan parameters, TIM broadcast response, Quality of Service (QoS) map, etc. This corresponds to some examples of information that may be included in the association request/response frame, and may be replaced with other information or additional information may be further included.

After the STA is successfully associated with the network, a security setup process may be performed in step S340. The security setup process of step S340 may be referred to as an authentication process through Robust Security Network Association (RSNA) request/response, and the authentication process of step S320 is referred to as a first authentication process, and the security setup process of step S340 may also simply be referred to as an authentication process.

The security setup process of step S340 may include, for example, a process of setting up a private key through 4-way handshaking through an Extensible Authentication Protocol over LAN (EAPOL) frame. In addition, the security setup process may be performed according to a security scheme not defined in the IEEE 802.11 standard.

Figure 4:
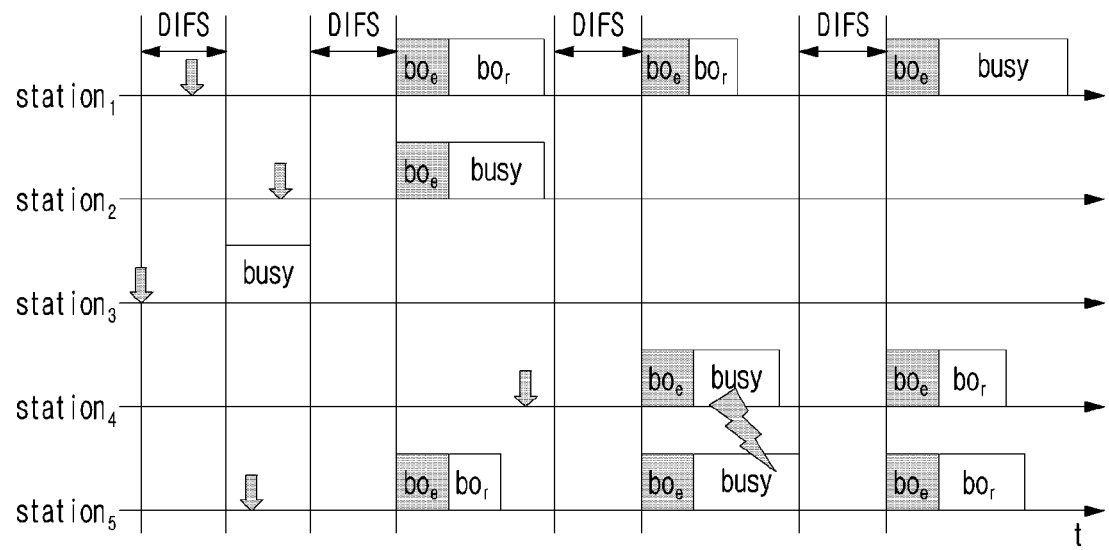
FIG. 4 is a diagram for explaining a backoff process to which the present disclosure may be applied.

FIG. 4 is a diagram for explaining a backoff process to which the present disclosure may be applied.

In the wireless LAN system, a basic access mechanism of medium access control (MAC) is a carrier sense multiple access with collision avoidance (CSMA/CA) mechanism. The CSMA/CA mechanism is also called Distributed Coordination Function (DCF) of IEEE 802.11 MAC, and basically adopts a "listen before talk" access mechanism. According to this type of access mechanism, the AP and/or STA may perform Clear Channel Assessment (CCA) sensing a radio channel or medium during a predetermined time interval (e.g., DCF Inter-Frame Space (DIFS)), prior to starting transmission. As a result of the sensing, if it is determined that the medium is in an idle state, frame transmission is started through the corresponding medium. On the other hand, if it is detected that the medium is occupied or busy, the corresponding AP and/or STA does not start its own transmission and may set a delay period for medium access (e.g., a random backoff period) and attempt frame transmission after waiting. By applying the random backoff period, since it is expected that several STAs attempt frame transmission after waiting for different periods of time, collision may be minimized.

In addition, the IEEE 802.11 MAC protocol provides a Hybrid Coordination Function (HCF). HCF is based on the DCF and Point Coordination Function (PCF). PCF is a polling-based synchronous access method and refers to a method in which all receiving APs and/or STAs periodically poll to receive data frames. In addition, HCF has Enhanced Distributed Channel Access (EDCA) and HCF Controlled Channel Access (HCCA). EDCA is a contention-based access method for a provider to provide data frames to multiple users, and HCCA uses a non-contention-based channel access method using a polling mechanism. In addition, the HCF includes a medium access mechanism for improving QoS (Quality of Service) of the wireless LAN, and may transmit QoS data in both a Contention Period (CP) and a Contention Free Period (CFP).

Referring to FIG. 4, an operation based on a random backoff period will be described. When the occupied/busy medium changes to an idle state, several STAs may attempt to transmit data (or frames). As a method for minimizing collisions, each of STAs may respectively select a random backoff count and attempt transmission after waiting for a corresponding slot time. The random backoff count has a pseudo-random integer value and may be determined as one of values ranging from 0 to CW. Here, CW is a contention window parameter value. The CW parameter is given CWmin as an initial value, but may take a value twice as large in case of transmission failure (e.g., when an ACK for the transmitted frame is not received). When the CW parameter value reaches CWmax, data transmission may be attempted while maintaining the CWmax value until data transmission is successful, and when data transmission is successful, the CWmin value is reset. The values of CW, CWmin and CWmax are preferably set to $2n-1$ ($n=0, 1, 2, \ldots$).

When the random backoff process starts, the STA continuously monitors the medium while counting down the backoff slots according to the determined backoff count value. When the medium is monitored for occupancy, it stops counting down and waits, and resumes the rest of the countdown when the medium becomes idle.

In the example of FIG. 4, when a packet to be transmitted arrives at the MAC of STA3, STA3 may transmit the frame immediately after confirming that the medium is idle as much as DIFS. The remaining STAs monitor and wait for the medium to be occupied/busy. In the meantime, data to be transmitted may also occur in each of STA1, STA2, and STA5, and each STA waits as long as DIFS when the medium is monitored as idle, and then may perform a countdown of the backoff slot according to the random backoff count value selected by each STA. Assume that STA2 selects the smallest backoff count value and STA1 selects the largest backoff count value. That is, the case where the remaining back-off time of STA5 is shorter than the remaining back-off time of STA1 at the time when STA2 completes the back-off count and starts frame transmission is exemplified. STA1 and STA5 temporarily stop counting down and wait while STA2 occupies the medium. When the occupation of STA2 ends and the medium becomes idle again, STA1 and STA5 wait for DIFS and resume the stopped backoff count. That is, frame transmission may be started after counting down the remaining backoff slots for the remaining backoff time. Since the remaining backoff time of STA5 is shorter than that of STA1, STA5 starts frame transmission. While STA2 occupies the medium, data to be transmitted may also occur in STA4. From the standpoint of STA4, when the medium becomes idle, STA4 may wait for DIFS, and then may perform a countdown according to the random backoff count value selected by the STA4 and start transmitting frames. The example of FIG. 4 shows a case where the remaining backoff time of STA5 coincides with the random backoff count value of STA4 by chance. In this case, a collision may occur between STA4 and STA5. When a collision occurs, both STA4 and STA5 do not receive an ACK, so data transmission fails. In this case, STA4 and STA5 may double the CW value, select a random backoff count value, and perform a countdown. STA1 waits while the medium is occupied due to transmission of STA4 and STA5, waits for DIFS when the medium becomes idle, and then starts frame transmission after the remaining backoff time has elapsed.

As in the example of FIG. 4, the data frame is a frame used for transmission of data forwarded to a higher layer, and may be transmitted after a backoff performed after DIFS elapses from when the medium becomes idle. Additionally, the management frame is a frame used for exchange of management information that is not forwarded to a higher layer, and is transmitted after a backoff performed after an IFS such as DIFS or Point Coordination Function IFS (PIFS). As a subtype frames of management frame, there are a Beacon, an association request/response, a re-association request/response, a probe request/response, an authentication request/response, etc. A control frame is a frame used to control access to a medium. As a subtype frames of control frame, there are Request-To-Send (RTS), Clear-To-Send (CTS), Acknowledgement (ACK), Power Save-Poll (PS-Poll), block ACK (BlockAck), block ACK request (BlockACKReq), null data packet announcement (NDP announcement), and trigger, etc. If the control frame is not a response frame of the previous frame, it is transmitted after backoff performed after DIFS elapses, and if it is a response frame of the previous frame, it is transmitted without performing backoff after short IFS (SIFS) elapses. The type and subtype of the frame may be identified by a type field and a subtype field in a frame control (FC) field.

A Quality of Service (QoS) STA may perform the backoff that is performed after an arbitration IFS (AIFS) for an access category (AC) to which the frame belongs, that is, AIFS[i] (where i is a value determined by AC), and then may transmit the frame. Here, the frame in which AIFS[i] can be used may be a data frame, a management frame, or a control frame other than a response frame.

Figure 5:
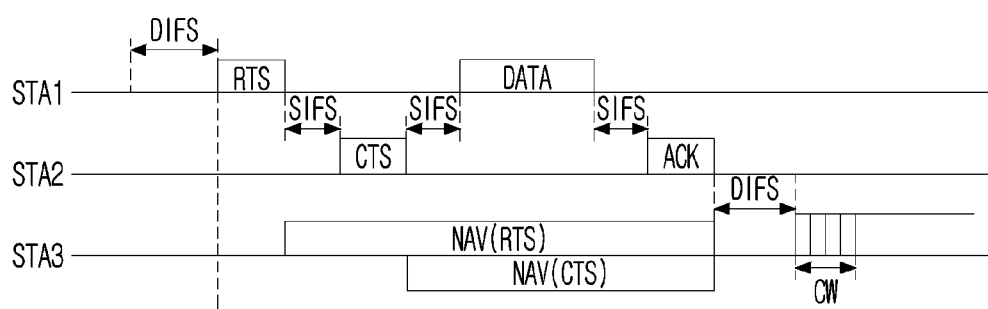
FIG. 5 is a diagram for explaining a frame transmission operation based on CSMA/CA to which the present disclosure may be applied.

FIG. 5 is a diagram for explaining a frame transmission operation based on CSMA/CA to which the present disclosure may be applied.

As described above, the CSMA/CA mechanism includes virtual carrier sensing in addition to physical carrier sensing in which a STA directly senses a medium. Virtual carrier sensing is intended to compensate for problems that may occur in medium access, such as a hidden node problem. For virtual carrier sensing, the MAC of the STA may use a Network Allocation Vector (NAV). The NAV is a value indicating, to other STAs, the remaining time until the medium is available for use by an STA currently using or having the right to use the medium. Therefore, the value set as NAV corresponds to a period in which the medium is scheduled to be used by the STA transmitting the frame, and the STA receiving the NAV value is prohibited from accessing the medium during the corresponding period. For example, the NAV may be configured based on the value of the "duration" field of the MAC header of the frame.

In the example of FIG. 5, it is assumed that a STA1 intends to transmit data to a STA2, and a STA3 is in a position capable of overhearing some or all of frames transmitted and received between the STA1 and the STA2.

In order to reduce the possibility of collision of transmissions of multiple STAs in CSMA/CA based frame transmission operation, a mechanism using RTS/CTS frames may be applied. In the example of FIG. 5, while transmission of the STA1 is being performed, as a result of carrier sensing of the STA3, it may be determined that the medium is in an idle state. That is, the STA1 may correspond to a hidden node to the STA3. Alternatively, in the example of FIG. 5, it may be determined that the carrier sensing result medium of the STA3 is in an idle state while transmission of the STA2 is being performed. That is, the STA2 may correspond to a hidden node to the STA3. Through the exchange of RTS/CTS frames before performing data transmission and reception between the STA1 and the STA2, a STA outside the transmission range of one of the STA1 or the STA2, or a STA outside the carrier sensing range for transmission from the STA1 or the STA3 may not attempt to occupy the channel during data transmission and reception between the STA1 and the STA2.

Specifically, the STA1 may determine whether a channel is being used through carrier sensing. In terms of physical carrier sensing, the STA1 may determine a channel occupation idle state based on an energy level or signal correlation detected in a channel. In addition, in terms of virtual carrier sensing, the STA1 may determine a channel occupancy state using a network allocation vector (NAV) timer.

The STA1 may transmit an RTS frame to the STA2 after performing a backoff when the channel is in an idle state during DIFS. When the STA2 receives the RTS frame, the STA2 may transmit a CTS frame as a response to the RTS frame to the STA1 after SIFS.

If the STA3 cannot overhear the CTS frame from the STA2 but can overhear the RTS frame from the STA1, the STA3 may set a NAV timer for a frame transmission period (e.g., SIFS+CTS frame+SIFS+data frame+SIFS+ACK frame) that is continuously transmitted thereafter, using the duration information included in the RTS frame.

Alternatively, if the STA3 can overhear a CTS frame from the STA2 although the STA3 cannot overhear an RTS frame from the STA1, the STA3 may set a NAV timer for a frame transmission period (e.g., SIFS+data frame+SIFS+ACK frame) that is continuously transmitted thereafter, using the duration information included in the CTS frame. That is, if the STA3 can overhear one or more of the RTS or CTS frames from one or more of the STA1 or the STA2, the STA3 may set the NAV accordingly. When the STA3 receives a new frame before the NAV timer expires, the STA3 may update the NAV timer using duration information included in the new frame. The STA3 does not attempt channel access until the NAV timer expires.

When the STA1 receives the CTS frame from the STA2, the STA1 may transmit the data frame to the STA2 after SIFS from the time point when the reception of the CTS frame is completed. When the STA2 successfully receives the data frame, the STA2 may transmit an ACK frame as a response to the data frame to the STA1 after SIFS. The STA3 may determine whether the channel is being used through carrier sensing when the NAV timer expires. When the STA3 determines that the channel is not used by other terminals during DIFS after expiration of the NAV timer, the STA3 may attempt channel access after a contention window (CW) according to a random backoff has passed.

Figure 6:
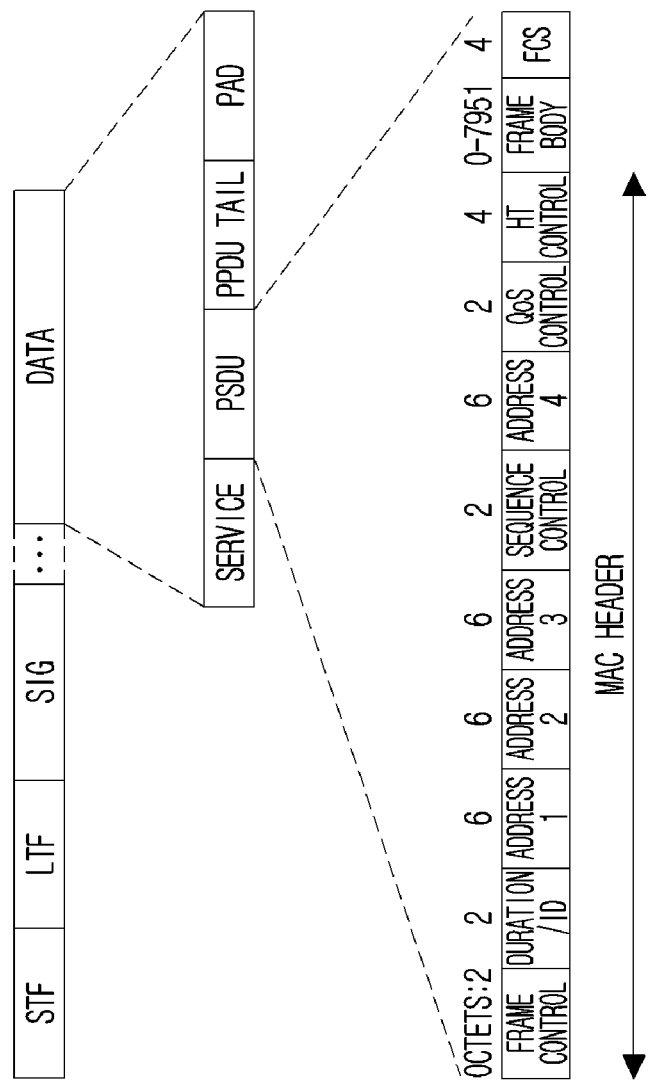
FIG. 6 is a diagram for explaining an example of a frame structure used in a WLAN system to which the present disclosure may be applied.

FIG. 6 is a diagram for explaining an example of a frame structure used in a WLAN system to which the present disclosure may be applied.

By means of an instruction or primitive (meaning a set of instructions or parameters) from the MAC layer, the PHY layer may prepare a MAC PDU (MPDU) to be transmitted. For example, when a command requesting transmission start of the PHY layer is received from the MAC layer, the PHY layer switches to the transmission mode and configures information (e.g., data) provided from the MAC layer in the form of a frame and transmits it. In addition, when the PHY layer detects a valid preamble of the received frame, the PHY layer monitors the header of the preamble and sends a command notifying the start of reception of the PHY layer to the MAC layer.

In this way, information transmission/reception in a wireless LAN system is performed in the form of a frame, and for this purpose, a PHY layer protocol data unit (PPDU) frame format is defined.

A basic PPDU frame may include a Short Training Field (STF), a Long Training Field (LTF), a SIGNAL (SIG) field, and a Data field. The most basic (e.g., non-High Throughput (HT)) PPDU frame format may consist of only L-STF (Legacy-STF), L-LTF (Legacy-LTF), SIG field, and data field. In addition, depending on the type of PPDU frame format (e.g., HT-mixed format PPDU, HT-greenfield format PPDU, VHT (Very High Throughput) PPDU, etc.), an additional (or different type) STF, LTF, and SIG fields may be included between the SIG field and the data field (this will be described later with reference to FIG. 7).

The STF is a signal for signal detection, automatic gain control (AGC), diversity selection, precise time synchronization, and the like, and the LTF is a signal for channel estimation and frequency error estimation. The STF and LTF may be referred to as signals for synchronization and channel estimation of the OFDM physical layer.

The SIG field may include a RATE field and a LENGTH field. The RATE field may include information on modulation and coding rates of data. The LENGTH field may include information on the length of data. Additionally, the SIG field may include a parity bit, a SIG TAIL bit, and the like.

The data field may include a SERVICE field, a physical layer service data unit (PSDU), and a PPDU TAIL bit, and may also include padding bits if necessary. Some bits of the SERVICE field may be used for synchronization of the descrambler at the receiving end. The PSDU corresponds to the MAC PDU defined in the MAC layer, and may include data generated/used in the upper layer. The PPDU TAIL bit may be used to return the encoder to a 0 state. Padding bits may be used to adjust the length of a data field in a predetermined unit.

A MAC PDU is defined according to various MAC frame formats, and a basic MAC frame consists of a MAC header, a frame body, and a Frame Check Sequence (FCS). The MAC frame may consist of MAC PDUs and be transmitted/received through the PSDU of the data part of the PPDU frame format.

The MAC header includes a Frame Control field, a Duration/ID field, an Address field, and the like. The frame control field may include control information required for frame transmission/reception. The duration/ID field may be set to a time for transmitting a corresponding frame or the like. For details of the Sequence Control, QoS Control, and HT Control subfields of the MAC header, refer to the IEEE 802.11 standard document.

A null-data packet (NDP) frame format means a frame format that does not include a data packet. That is, the NDP frame refers to a frame format that includes a physical layer convergence procedure (PLCP) header part (i.e., STF, LTF, and SIG fields) in a general PPDU frame format and does not include the remaining parts (i.e., data field). A NDP frame may also be referred to as a short frame format.

Figure 7:
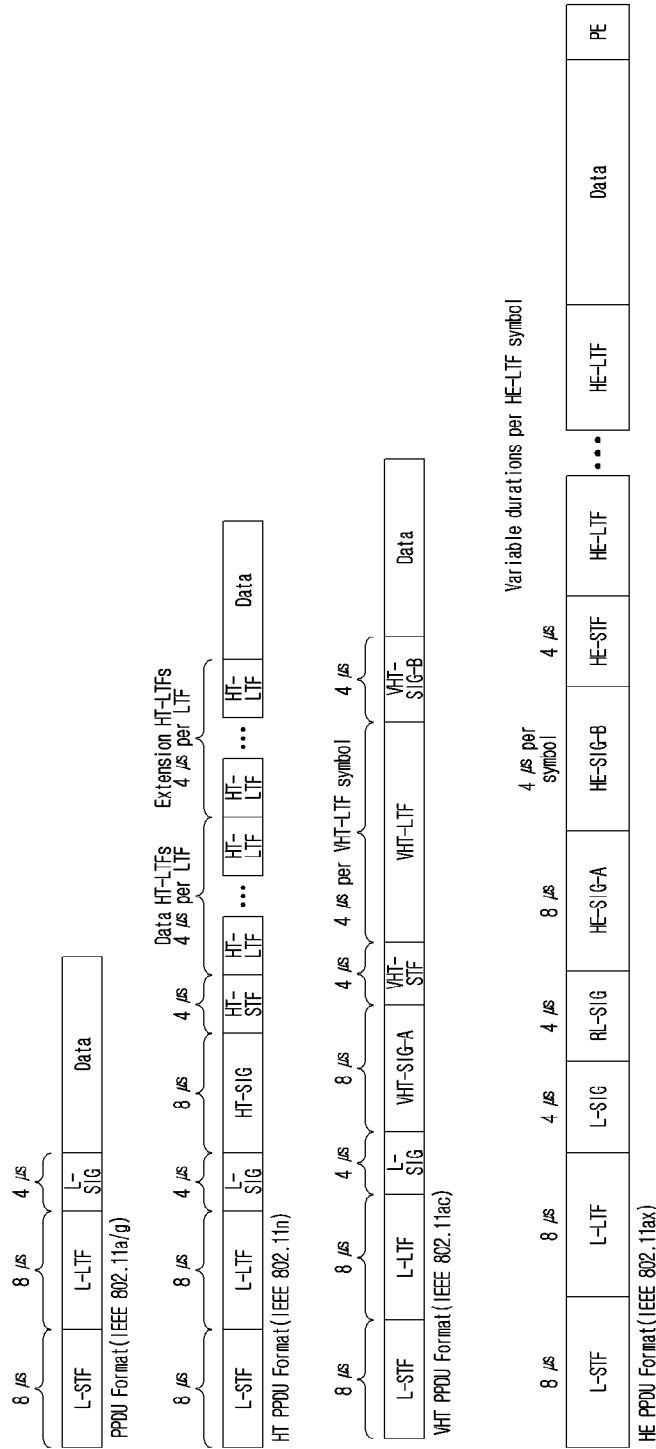
FIG. 7 is a diagram illustrating examples of PPDUs defined in the IEEE 802.11 standard to which the present disclosure may be applied.

FIG. 7 is a diagram illustrating examples of PPDUs defined in the IEEE 802.11 standard to which the present disclosure may be applied.

In standards such as IEEE 802.11a/g/n/ac/ax, various types of PPDUs have been used. The basic PPDU format (IEEE 802.11a/g) includes L-LTF, L-STF, L-SIG and Data fields. The basic PPDU format may also be referred to as a non-HT PPDU format.

The HT PPDU format (IEEE 802.11n) additionally includes HT-SIG, HT-STF, and HT-LFT(s) fields to the basic PPDU format. The HT PPDU format shown in FIG. 7 may be referred to as an HT-mixed format. In addition, an HT-greenfield format PPDU may be defined, and this corresponds to a format consisting of HT-GF-STF, HT-LTF1, HT-SIG, one or more HT-LTF, and Data field, not including L-STF, L-LTF, and L-SIG (not shown).

An example of the VHT PPDU format (IEEE 802.11ac) additionally includes VHT SIG-A, VHT-STF, VHT-LTF, and VHT-SIG-B fields to the basic PPDU format.

An example of the HE PPDU format (IEEE 802.11ax) additionally includes Repeated L-SIG (RL-SIG), HE-SIG-A, HE-SIG-B, HE-STF, HE-LTF(s), Packet Extension (PE) field to the basic PPDU format. Some fields may be excluded or their length may vary according to detailed examples of the HE PPDU format. For example, the HE-SIG-B field is included in the HE PPDU format for multi-user (MU), and the HE-SIG-B is not included in the HE PPDU format for single user (SU). In addition, the HE trigger-based (TB) PPDU format does not include the HE-SIG-B, and the length of the HE-STF field may vary to 8 us. The Extended Range (HE ER) SU PPDU format does not include the HE-SIG-B field, and the length of the HE-SIG-A field may vary to 16 us.

Figure 8:
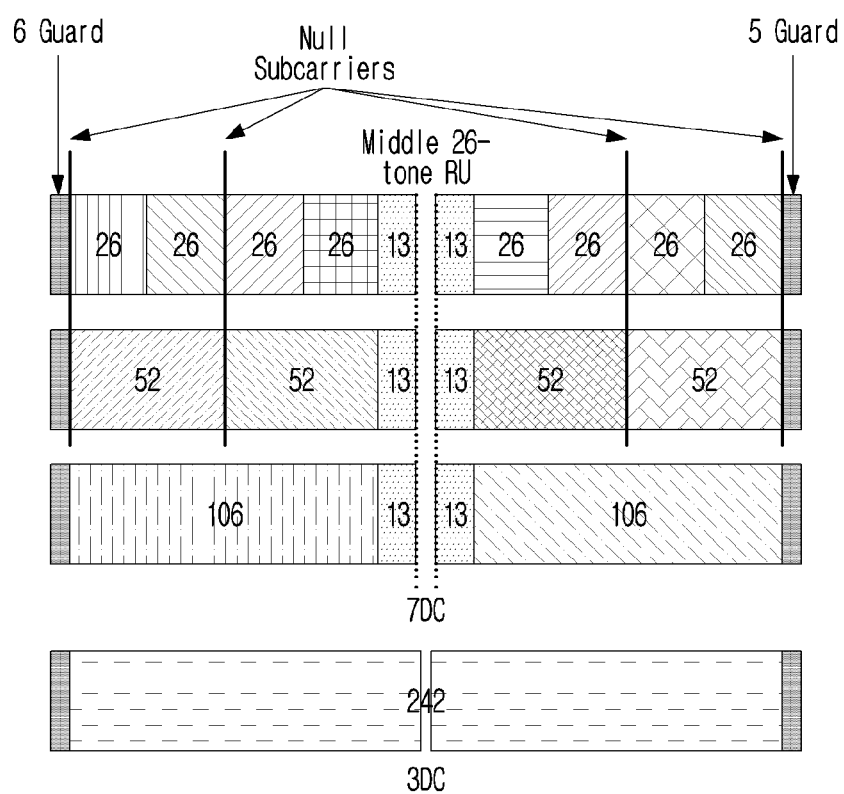
FIGS. 8 to 10 are diagrams for explaining examples of resource units of a WLAN system to which the present disclosure may be applied.
Figure 9:
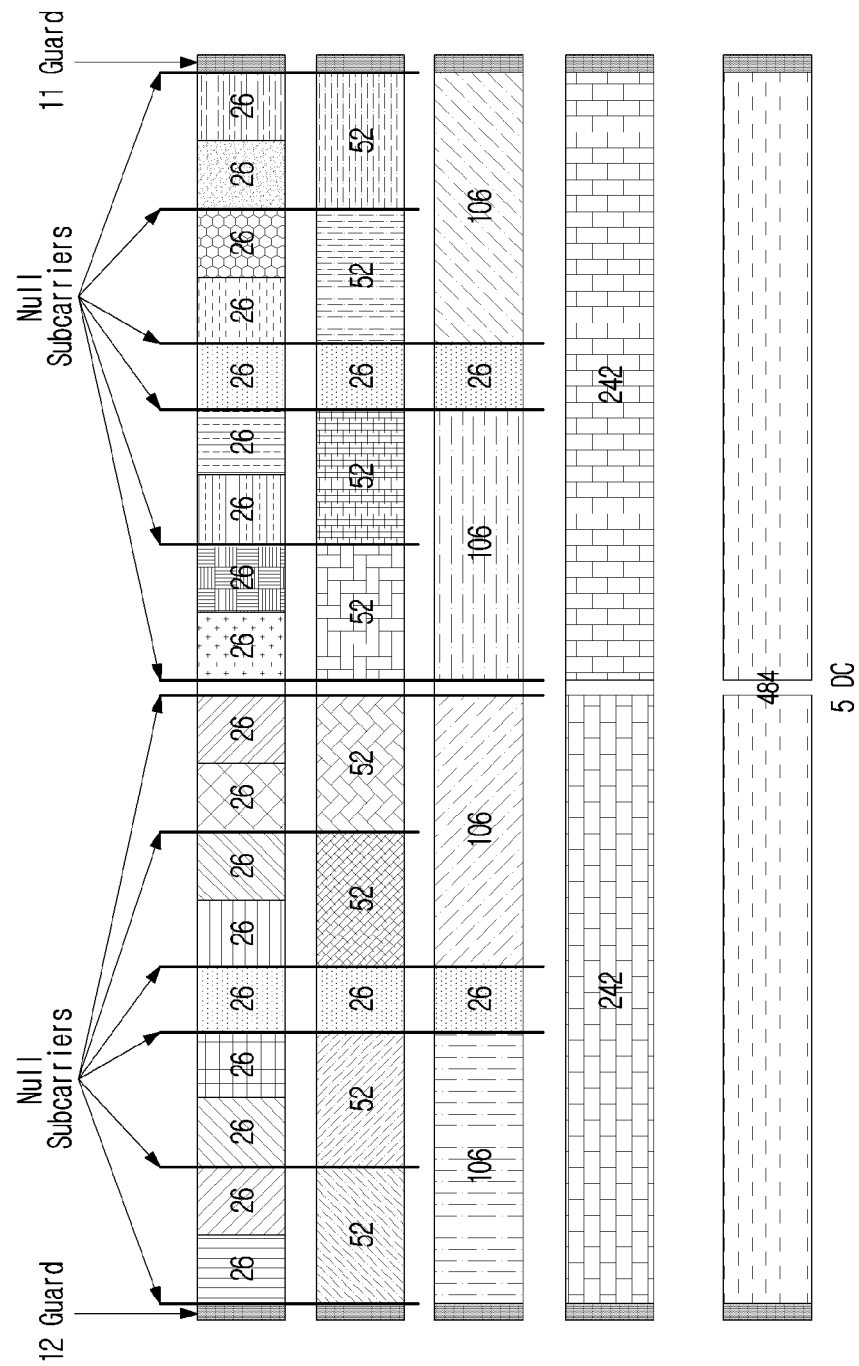
Figure 10:
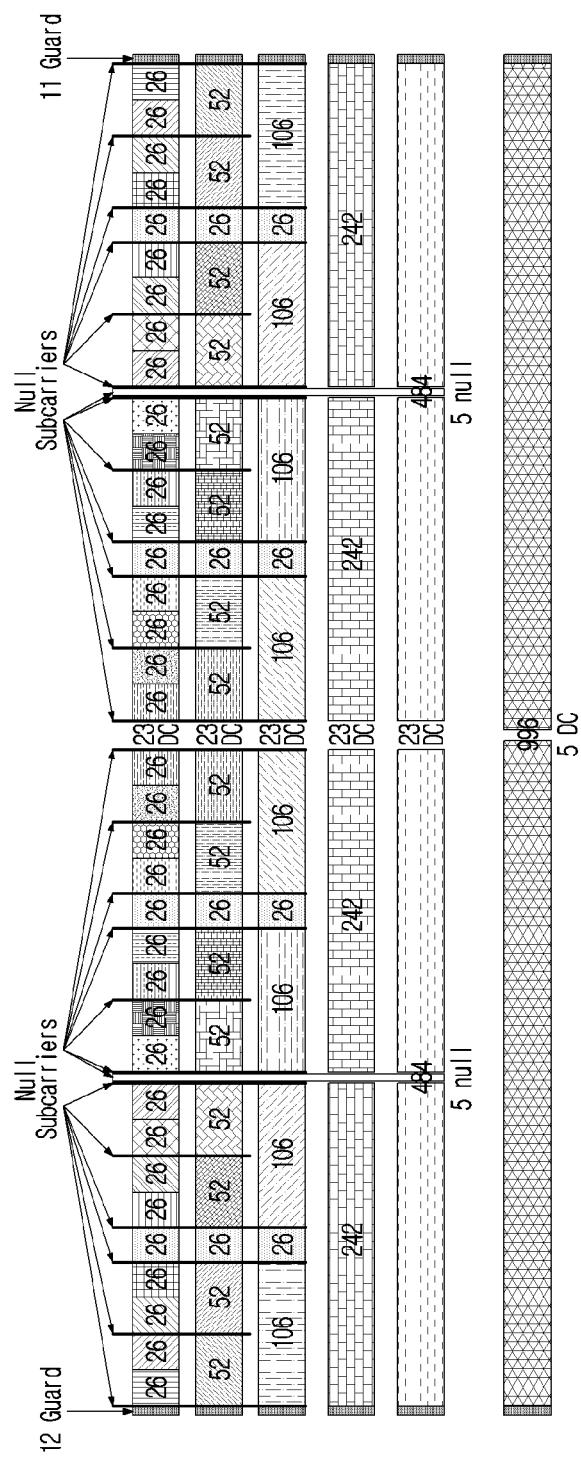

FIGS. 8 to 10 are diagrams for explaining examples of resource units of a WLAN system to which the present disclosure may be applied.

Referring to FIGS. 8 to 10, a resource unit (RU) defined in a wireless LAN system will be described. the RU may include a plurality of subcarriers (or tones). The RU may be used when transmitting signals to multiple STAs based on the OFDMA scheme. In addition, the RU may be defined even when a signal is transmitted to one STA. The RU may be used for STF, LTF, data field of the PPDU, etc.

As shown in FIGS. 8 to 10, RUs corresponding to different numbers of tones (i.e., subcarriers) are used to construct some fields of 20 MHz, 40 MHz, or 80 MHz X-PPDUs (X is HE, EHT, etc.). For example, resources may be allocated in RU units shown for the X-STF, X-LTF, and Data field.

FIG. 8 is a diagram illustrating an exemplary allocation of resource units (RUs) used on a 20 MHz band.

As shown at the top of FIG. 8, 26-units (i.e., units corresponding to 26 tones) may be allocated. 6 tones may be used as a guard band in the leftmost band of the 20 MHz band, and 5 tones may be used as a guard band in the rightmost band of the 20 MHz band. In addition, 7 DC tones are inserted in the center band, that is, the DC band, and 26-units corresponding to each of the 13 tones may exist on the left and right sides of the DC band. In addition, 26-unit, 52-unit, and 106-unit may be allocated to other bands. Each unit may be allocated for STAs or users.

The RU allocation of FIG. 8 is utilized not only in a situation for multiple users (MU) but also in a situation for a single user (SU), and in this case, it is possible to use one 242-unit as shown at the bottom of FIG. 8. In this case, three DC tones may be inserted.

In the example of FIG. 8, RUs of various sizes, that is, 26-RU, 52-RU, 106-RU, 242-RU, etc. are exemplified, but the specific size of these RUs may be reduced or expanded. Therefore, in the present disclosure, the specific size of each RU (i.e., the number of corresponding tones) is exemplary and not restrictive. In addition, within a predetermined bandwidth (e.g., 20, 40, 80, 160, 320 MHz, . . . ) in the present disclosure, the number of RUs may vary according to the size of the RU. In the examples of FIG. 9 and/or FIG. 10 to be described below, the fact that the size and/or number of RUs may be varied is the same as the example of FIG. 8.

FIG. 9 is a diagram illustrating an exemplary allocation of resource units (RUs) used on a 40 MHz band.

Just as RUs of various sizes are used in the example of FIG. 8, 26-RU, 52-RU, 106-RU, 242-RU, 484-RU, and the like may be used in the example of FIG. 9 as well. In addition, 5 DC tones may be inserted at the center frequency, 12 tones may be used as a guard band in the leftmost band of the 40 MHz band, and 11 tones may be used as a guard band in the rightmost band of the 40 MHz band.

In addition, as shown, when used for a single user, a 484-RU may be used.

FIG. 10 is a diagram illustrating an exemplary allocation of resource units (RUs) used on an 80 MHz band.

Just as RUs of various sizes are used in the example of FIG. 8 and FIG. 9, 26-RU, 52-RU, 106-RU, 242-RU, 484-RU, 996-RU and the like may be used in the example of FIG. 10 as well. In addition, in the case of an 80 MHz PPDU, RU allocation of HE PPDUs and EHT PPDUs may be different, and the example of FIG. 10 shows an example of RU allocation for 80 MHz EHT PPDUs. The scheme that 12 tones are used as a guard band in the leftmost band of the 80 MHz band and 11 tones are used as a guard band in the rightmost band of the 80 MHz band in the example of FIG. 10 is the same in HE PPDU and EHT PPDU. Unlike HE PPDU, where 7 DC tones are inserted in the DC band and there is one 26-RU corresponding to each of the 13 tones on the left and right sides of the DC band, in the EHT PPDU, 23 DC tones are inserted into the DC band, and one 26-RU exists on the left and right sides of the DC band. Unlike the HE PPDU, where one null subcarrier exists between 242-RUs rather than the center band, there are five null subcarriers in the EHT PPDU. In the HE PPDU, one 484-RU does not include null subcarriers, but in the EHT PPDU, one 484-RU includes 5 null subcarriers.

In addition, as shown, when used for a single user, 996-RU may be used, and in this case, 5 DC tones are inserted in common with HE PPDU and EHT PPDU.

EHT PPDUs over 160 MHz may be configured with a plurality of 80 MHz subblocks in FIG. 10. The RU allocation for each 80 MHz subblock may be the same as that of the 80 MHz EHT PPDU of FIG. 10. If the 80 MHz subblock of the 160 MHz or 320 MHz EHT PPDU is not punctured and the entire 80 MHz subblock is used as part of RU or multiple RU (MRU), the 80 MHz subblock may use 996-RU of FIG. 10.

Here, the MRU corresponds to a group of subcarriers (or tones) composed of a plurality of RUs, and the plurality of RUs constituting the MRU may be RUs having the same size or RUs having different sizes. For example, a single MRU may be defined as 52+26-tone, 106+26-tone, 484+242-tone, 996+484-tone, 996+484+242-tone, 2×996+484-tone, 3×996-tone, or 3×996+484-tone. Here, the plurality of RUs constituting one MRU may correspond to small size (e.g., 26, 52, or 106) RUs or large size (e.g., 242, 484, or 996) RUs. That is, one MRU including a small size RU and a large size RU may not be configured/defined. In addition, a plurality of RUs constituting one MRU may or may not be consecutive in the frequency domain.

When an 80 MHz subblock includes RUs smaller than 996 tones, or parts of the 80 MHz subblock are punctured, the 80 MHz subblock may use RU allocation other than the 996-tone RU.

The RU of the present disclosure may be used for uplink (UL) and/or downlink (DL) communication. For example, when trigger-based UL-MU communication is performed, the STA transmitting the trigger (e.g., AP) may allocate a first RU (e.g., 26/52/106/242-RU, etc.) to a first STA and allocate a second RU (e.g., 26/52/106/242-RU, etc.) to a second STA, through trigger information (e.g., trigger frame or triggered response scheduling (TRS)). Thereafter, the first STA may transmit a first trigger-based (TB) PPDU based on the first RU, and the second STA may transmit a second TB PPDU based on the second RU. The first/second TB PPDUs may be transmitted to the AP in the same time period.

For example, when a DL MU PPDU is configured, the STA transmitting the DL MU PPDU (e.g., AP) may allocate a first RU (e.g., 26/52/106/242-RU, etc.) to a first STA and allocate a second RU (e.g., 26/52/106/242-RU, etc.) to a second STA. That is, the transmitting STA (e.g., AP) may transmit HE-STF, HE-LTF, and Data field for the first STA through the first RU and transmit HE-STF, HE-LTF, and Data field for the second STA through the second RU, in one MU PPDU, Information on the allocation of RUs may be signaled through HE-SIG-B in the HE PPDU format.

Figure 11:
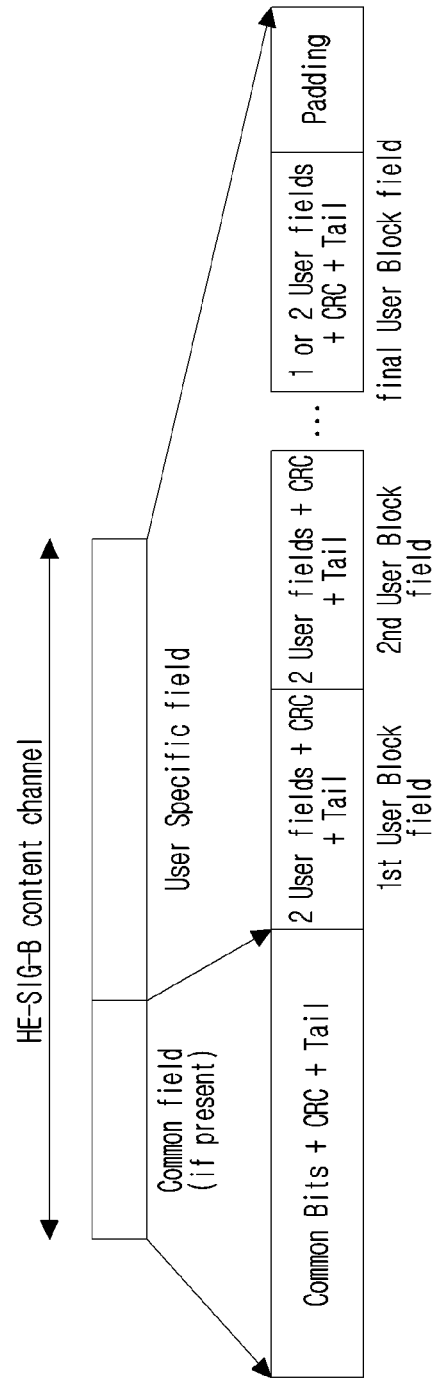
FIG. 11 illustrates an example structure of a HE-SIG-B field.

FIG. 11 illustrates an example structure of a HE-SIG-B field.

As shown, the HE-SIG-B field may include a common field and a user-specific field. If HE-SIG-B compression is applied (e.g., full-bandwidth MU-MIMO transmission), the common field may not be included in HE-SIG-B, and the HE-SIG-B content channel may include only a user-specific field. If HE-SIG-B compression is not applied, the common field may be included in HE-SIG-B.

The common field may include information on RU allocation (e.g., RU assignment, RUs allocated for MU-MIMO, the number of MU-MIMO users (STAs), etc.)

The common field may include N*8 RU allocation subfields. Here, N is the number of subfields, N=1 in the case of 20 or 40 MHz MU PPDU, N=2 in the case of 80 MHz MU PPDU, N=4 in the case of 160 MHz or 80+80 MHz MU PPDU, etc. One 8-bit RU allocation subfield may indicate the size (26, 52, 106, etc.) and frequency location (or RU index) of RUs included in the 20 MHz band.

For example, if a value of the 8-bit RU allocation subfield is 00000000, it may indicate that nine 26-RUs are sequentially allocated in order from the leftmost to the rightmost in the example of FIG. 8, if the value is 00000001, it may indicate that seven 26-RUs and one 52-RU are sequentially allocated in order from leftmost to rightest, and if the value is 00000010, it may indicate that five 26-RUs, one 52-RU, and two 26-RUs are sequentially allocated from the leftmost side to the rightmost side.

As an additional example, if the value of the 8-bit RU allocation subfield is 01000y2y1y0, it may indicate that one 106-RU and five 26-RUs are sequentially allocated from the leftmost to the rightmost in the example of FIG. 8. In this case, multiple users/STAs may be allocated to the 106-RU in the MU-MIMO scheme. Specifically, up to 8 users/STAs may be allocated to the 106-RU, and the number of users/

STAs allocated to the 106-RU is determined based on 3-bit information (i.e., y2y1y0). For example, when the 3-bit information (y2y1y0) corresponds to a decimal value N, the number of users/STAs allocated to the 106-RU may be N+1.

Basically, one user/STA may be allocated to each of a plurality of RUs, and different users/STAs may be allocated to different RUs. For RUs larger than a predetermined size (e.g., 106, 242, 484, 996-tones, . . . ), a plurality of users/STAs may be allocated to one RU, and MU-MIMO scheme may be applied for the plurality of users/STAs.

The set of user-specific fields includes information on how all users (STAs) of the corresponding PPDU decode their payloads. User-specific fields may contain zero or more user block fields. The non-final user block field includes two user fields (i.e., information to be used for decoding in two STAs). The final user block field contains one or two user fields. The number of user fields may be indicated by the RU allocation subfield of HE-SIG-B, the number of symbols of HE-SIG-B, or the MU-MIMO user field of HE-SIG-A. A User-specific field may be encoded separately from or independently of a common field.

Figure 12:
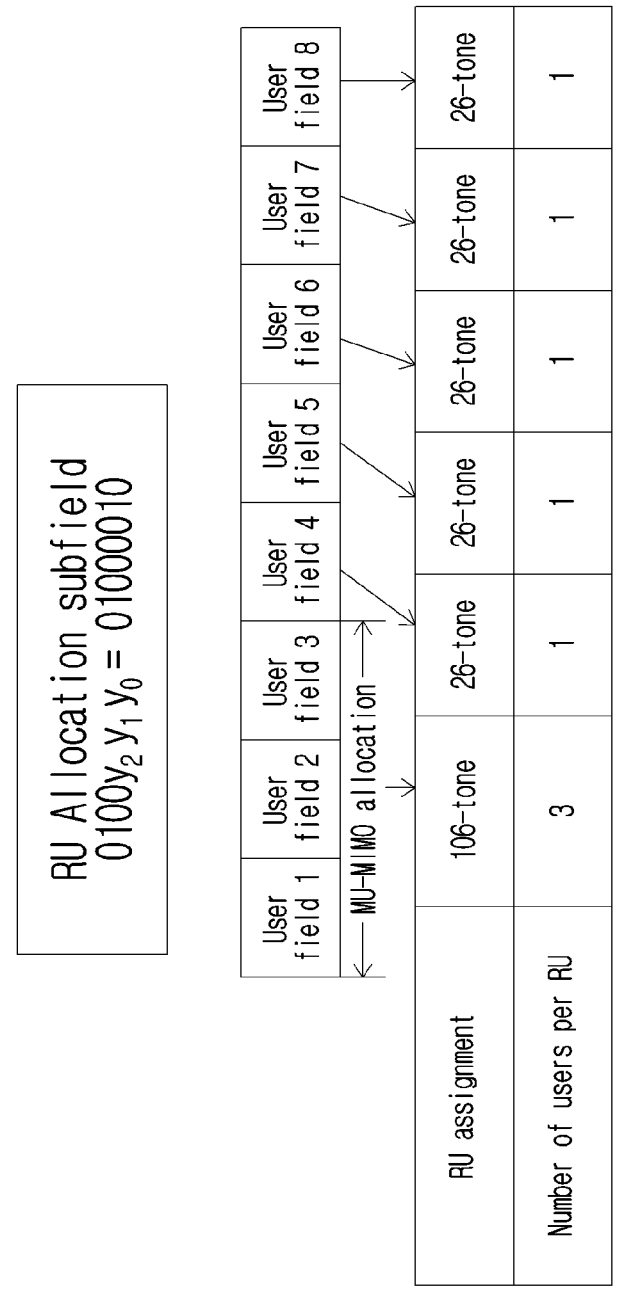
FIG. 12 is a diagram for explaining a MU-MIMO method in which a plurality of users/STAs are allocated to one RU.

FIG. 12 is a diagram for explaining a MU-MIMO method in which a plurality of users/STAs are allocated to one RU.

In the example of FIG. 12, it is assumed that the value of the RU allocation subfield is 01000010. This corresponds to the case where y2y1y0=010 in 01000y2y1y0. 010 corresponds to 2 in decimal (i.e., N=2) and may indicate that 3 (=N+1) users are allocated to one RU. In this case, one 106-RU and five 26-RUs may be sequentially allocated from the leftmost side to the rightmost side of a specific 20 MHz band/channel. Three users/STAs may be allocated to the 106-RU in a MU-MIMO manner. As a result, a total of 8 users/STAs are allocated to the 20 MHz band/channel, and the user-specific field of HE-SIG-B may include 8 user fields (i.e., 4 user block fields). Eight user fields may be assigned to RUs as shown in FIG. 12.

The user field may be constructed based on two formats. The user field for a MU-MIMO allocation may be constructed with a first format, and the user field for non-MU-MIMO allocation may be constructed with a second format. Referring to the example of FIG. 12, user fields 1 to 3 may be based on the first format, and user fields 4 to 8 may be based on the second format. The first format and the second format may contain bit information of the same length (e.g., 21 bits).

The user field of the first format (i.e., format for MU-MIMO allocation) may be constructed as follows. For example, out of all 21 bits of one user field, B0-B10 includes the user's identification information (e.g., STA-ID, AID, partial AID, etc.), B11-14 includes spatial configuration information such as the number of spatial streams for the corresponding user, B15-B18 includes Modulation and Coding Scheme (MCS) information applied to the Data field of the corresponding PPDU, B19 is defined as a reserved field, and B20 may include information on a coding type (e.g., binary convolutional coding (BCC) or low-density parity check (LDPC)) applied to the Data field of the corresponding PPDU.

The user field of the second format (i.e., the format for non-MU-MIMO allocation) may be constructed as follows. For example, out of all 21 bits of one user field, B0-B10 includes the user's identification information (e.g., STA-ID, AID, partial AID, etc.), B11-13 includes information on the number of spatial streams (NSTS) applied to the corresponding RU, B14 includes information indicating whether beamforming is performed (or whether a beamforming steering matrix is applied), B15-B18 includes Modulation and Coding Scheme (MCS) information applied to the Data field of the corresponding PPDU, B19 includes information indicating whether DCM (dual carrier modulation) is applied, and B20 may include information on a coding type (e.g., BCC or LDPC) applied to the Data field of the corresponding PPDU.

MCS, MCS information, MCS index, MCS field, and the like used in the present disclosure may be indicated by a specific index value. For example, MCS information may be indicated as index 0 to index 11. MCS information includes information on constellation modulation type (e.g., BPSK, QPSK, 16-QAM, 64-QAM, 256-QAM, 1024-QAM, etc.), and coding rate (e.g., 1/2, 2/3, 3/4, 5/6, etc.). Information on a channel coding type (e.g., BCC or LDPC) may be excluded from the MCS information.

Figure 13:
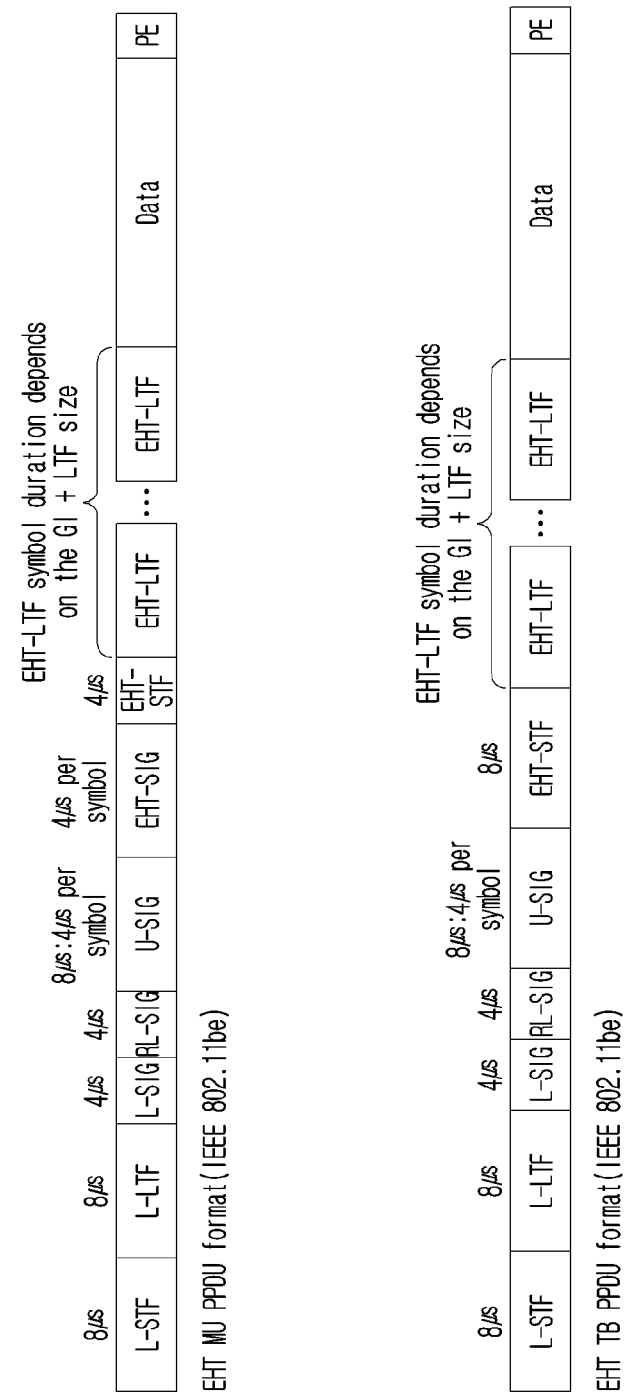
FIG. 13 illustrates an example of a PPDU format to which the present disclosure may be applied.

FIG. 13 illustrates an example of a PPDU format to which the present disclosure may be applied.

The PPDU of FIG. 13 may be referred as various names such as an EHT PPDU, a transmitted PPDU, a received PPDU, a first type or an Nth type PPDU. For example, the PPDU or EHT PPDU of the present disclosure may be referred as various names such as a transmission PPDU, a reception PPDU, a first type or an Nth type PPDU. In addition, the EHT PPU may be used in an EHT system and/or a new wireless LAN system in which the EHT system is improved.

The EHT MU PPDU of FIG. 13 corresponds to a PPDU carrying one or more data (or PSDUs) for one or more users. That is, the EHT MU PPDU may be used for both SU transmission and MU transmission. For example, the EHT MU PPDU may correspond to a PPDU for one receiving STA or a plurality of receiving STAs.

In the EHT TB PPDU of FIG. 13, the EHT-SIG is omitted compared to the EHT MU PPDU. Upon receiving a trigger for UL MU transmission (eg, a trigger frame or TRS), the STA may perform UL transmission based on the EHT TB PPDU format.

In the example of the EHT PPDU format of FIG. 13, L-STF to EHT-LTF correspond to a preamble or a physical preamble, and may be generated/transmitted/received/acquired/decoded in the physical layer.

A Subcarrier frequency spacing of L-STF, L-LTF, L-SIG, RL-SIG, Universal SIGNAL (U-SIG), EHT-SIG field (these are referred to as pre-EHT modulated fields) may be set to 312.5 kHz. A subcarrier frequency spacing of the EHT-STF, EHT-LTF, Data, and PE field (these are referred to as EHT modulated fields) may be set to 78.125 kHz. That is, the tone/subcarrier index of L-STF, L-LTF, L-SIG, RL-SIG, U-SIG, and EHT-SIG field may be indicated in units of 312.5 kHz, and the tone/subcarrier index of EHT-STF, EHT-LTF, Data, and PE field may be indicated in units of 78.125 kHz.

The L-LTF and L-STF of FIG. 13 may be constructed identically to the corresponding fields of the PPDU described in FIGS. 6 to 7.

The L-SIG field of FIG. 13 may be constructed with 24 bits and may be used to communicate rate and length information. For example, the L-SIG field includes a 4-bit Rate field, a 1-bit Reserved bit, a 12-bit Length field, a 1-bit Parity field, and a 6-bit Tail field may be included. For example, the 12-bit Length field may include information on a time duration or a length of the PPDU. For example, a value of the 12-bit Length field may be determined based on the type of PPDU. For example, for a non-HT, HT, VHT, or EHT PPDU, the value of the Length field may be determined as a multiple of 3. For example, for the HE PPDU, the value of the Length field may be determined as a multiple of 3+1 or a multiple of 3+2.

For example, the transmitting STA may apply BCC encoding based on a coding rate of 1/2 to 24-bit information of the L-SIG field. Thereafter, the transmitting STA may obtain 48-bit BCC coded bits. BPSK modulation may be applied to 48-bit coded bits to generate 48 BPSK symbols. The transmitting STA may map 48 BPSK symbols to any location except for a pilot subcarrier (e,g, {subcarrier index −21, −7, +7, +21}) and a DC subcarrier (e.g., {subcarrier index 0}). As a result, 48 BPSK symbols may be mapped to subcarrier indices −26 to −22, −20 to −8, −6 to −1, +1 to +6, +8 to +20, and +22 to +26. The transmitting STA may additionally map the signals of {−1, −1, −1, 1} to the subcarrier index {−28, −27, +27, +28}. The above signal may be used for channel estimation in the frequency domain corresponding to {−28, −27, +27, +28}.

The transmitting STA may construct RL-SIG which is constructed identically to L-SIG. For RL-SIG, BPSK modulation is applied. The receiving STA may recognize that the received PPDU is a HE PPDU or an EHT PPDU based on the existence of the RL-SIG.

After the RL-SIG of FIG. 13, a Universal SIG (U-SIG) may be inserted. The U-SIG may be referred as various names such as a first SIG field, a first SIG, a first type SIG, a control signal, a control signal field, and a first (type) control signal, etc.

The U-SIG may include N-bit information and may include information for identifying the type of EHT PPDU. For example, U-SIG may be configured based on two symbols (e.g., two consecutive OFDM symbols). Each symbol (e.g., OFDM symbol) for the U-SIG may have a duration of 4us, and the U-SIG may have a total 8us duration. Each symbol of the U-SIG may be used to transmit 26 bit information. For example, each symbol of the U-SIG may be transmitted and received based on 52 data tones and 4 pilot tones.

Through the U-SIG (or U-SIG field), for example, A bit information (e.g., 52 un-coded bits) may be transmitted, the first symbol of the U-SIG (e.g., U-SIG-1) may transmit the first X bit information (e.g., 26 un-coded bits) of the total A bit information, and the second symbol of the U-SIG (e.g., U-SIG-2) may transmit the remaining Y-bit information (e.g., 26 un-coded bits) of the total A-bit information. For example, the transmitting STA may obtain 26 un-coded bits included in each U-SIG symbol. The transmitting STA may generate 52-coded bits by performing convolutional encoding (e.g., BCC encoding) based on a rate of R=1/2, and perform interleaving on the 52-coded bits. The transmitting STA may generate 52 BPSK symbols allocated to each U-SIG symbol by performing BPSK modulation on the interleaved 52-coded bits. One U-SIG symbol may be transmitted based on 56 tones (subcarriers) from subcarrier index −28 to subcarrier index+28, except for DC index 0. The 52 BPSK symbols generated by the transmitting STA may be transmitted based on the remaining tones (subcarriers) excluding pilot tones −21, −7, +7, and +21 tones.

For example, the A bit information (e.g., 52 un-coded bits) transmitted by the U-SIG includes a CRC field (e.g., a 4-bit field) and a tail field (e.g., 6 bit-length field). The CRC field and the tail field may be transmitted through the second symbol of the U-SIG. The CRC field may be constructed based on 26 bits allocated to the first symbol of U-SIG and 16 bits remaining except for the CRC/tail field in the second symbol, and may be constructed based on a conventional CRC calculation algorithm. In addition, the tail field may be used to terminate the trellis of the convolution decoder, and for example, the tail field may be set to 0.

A bit information (e.g., 52 un-coded bits) transmitted by the U-SIG (or U-SIG field) may be divided into version-independent bits and version-independent bits. For example, a size of the version-independent bits may be fixed or variable. For example, the version-independent bits may be allocated only to the first symbol of U-SIG, or the version-independent bits may be allocated to both the first symbol and the second symbol of U-SIG. For example, the version-independent bits and the version-dependent bits may be referred as various names such as a first control bit and a second control bit, etc.

For example, the version-independent bits of the U-SIG may include a 3-bit physical layer version identifier (PHY version identifier). For example, the 3-bit PHY version identifier may include information related to the PHY version of the transmitted/received PPDU. For example, the first value of the 3-bit PHY version identifier may indicate that the transmission/reception PPDU is an EHT PPDU. In other words, when transmitting the EHT PPDU, the transmitting STA may set the 3-bit PHY version identifier to a first value. In other words, the receiving STA may determine that the received PPDU is an EHT PPDU based on the PHY version identifier having the first value.

For example, the version-independent bits of U-SIG may include a 1-bit UL/DL flag field. A first value of the 1-bit UL/DL flag field is related to UL communication, and a second value of the UL/DL flag field is related to DL communication.

For example, the version-independent bits of the U-SIG may include information on the length of a transmission opportunity (TXOP) and information on a BSS color ID.

For example, if the EHT PPDU is classified into various types (e.g., EHT PPDU related to SU mode, EHT PPDU related to MU mode, EHT PPDU related to TB mode, EHT PPDU related to Extended Range transmission, etc.), information on the type of EHT PPDU may be included in the version-dependent bits of the U-SIG.

For example, the U-SIG may include information on 1) a bandwidth field containing information on a bandwidth, 2) a field containing information on a MCS scheme applied to EHT-SIG, 3) an indication field containing information related to whether the DCM technique is applied to the EHT-SIG, 4) a field containing information on the number of symbols used for EHT-SIG, 5) a field containing information on whether EHT-SIG is constructed over all bands, 6) a field containing information on the type of EHT-LTF/STF, and 7) a field indicating the length of EHT-LTF and CP length.

Preamble puncturing may be applied to the PPDU of FIG. 13. Preamble puncturing may mean transmission of a PPDU for which no signal is present in one or more 20 MHz subchannels among the bandwidth of the PPDU. Preamble puncturing may be applied to a PPDU transmitted to one or more users. For example, the resolution of preamble puncturing may be 20 MHz for EHT MU PPDUs in OFDMA transmissions with bandwidths greater than 40 MHz and non-OFDMA transmissions with 80 MHz and 160 MHz bandwidths. That is, in the above case, puncturing on a subchannel smaller than 242-tone RU may not be allowed. In addition, for an EHT MU PPDU in non-OFDMA transmission with a bandwidth of 320 MHz, the resolution of preamble puncturing may be 40 MHz. That is, puncturing for a subchannel smaller than 484-tone RU in a 320 MHz bandwidth may not be allowed. In addition, preamble puncturing may not be applied to the primary 20 MHz channel in the EHT MU PPDU.

For example, for an EHT MU PPDU, information on preamble puncturing may be included in the U-SIG and/or the EHT-SIG. For example, the first field of the U-SIG may include information on the contiguous bandwidth of the PPDU, and the second field of the U-SIG may include information on preamble puncturing applied to the PPDU.

For example, the U-SIG and the EHT-SIG may include information on preamble puncturing based on the following method. If the bandwidth of the PPDU exceeds 80 MHz, the U-SIG may be individually constructed in units of 80 MHz. For example, if the bandwidth of the PPDU is 160 MHz, the PPDU may include a first U-SIG for a first 80 MHz band and a second U-SIG for a second 80 MHz band. In this case, the first field of the first U-SIG includes information on the 160 MHz bandwidth, and the second field of the first U-SIG includes information on preamble puncturing applied to the first 80 MHz band (i.e., information on a preamble puncturing pattern). In addition, the first field of the second U-SIG includes information on a 160 MHz bandwidth, and the second field of the second U-SIG includes information on preamble puncturing applied to a second 80 MHz band (i.e., information on a preamble puncturing pattern). The EHT-SIG following the first U-SIG may include information on preamble puncturing applied to the second 80 MHz band (i.e., information on a preamble puncturing pattern), and the EHT-SIG following the second U-SIG may include information on preamble puncturing applied to the first 80 MHz band (i.e., information on a preamble puncturing pattern).

Additionally or alternatively, the U-SIG and the EHT-SIG may include information on preamble puncturing based on the following method. The U-SIG may include information on preamble puncturing for all bands (i.e., information on a preamble puncturing pattern). That is, EHT-SIG does not include information on preamble puncturing, and only U-SIG may include information on preamble puncturing (ie, information on a preamble puncturing pattern).

U-SIG may be constructed in units of 20 MHz. For example, if an 80 MHz PPDU is constructed, the U-SIG may be duplicated. That is, the same 4 U-SIGs may be included in the 80 MHz PPDU. PPDUs exceeding 80 MHz bandwidth may include different U-SIGs.

The EHT-SIG of FIG. 13 may include control information for the receiving STA. EHT-SIG may be transmitted through at least one symbol, and one symbol may have a length of 4us. Information on the number of symbols used for EHT-SIG may be included in U-SIG.

The EHT-SIG may include technical features of HE-SIG-B described through FIGS. 11 and 12. For example, EHT-SIG, like the example of FIG. 8, may include a common field and a user-specific field. The Common field of the EHT-SIG may be omitted, and the number of user-specific fields may be determined based on the number of users.

As in the example of FIG. 11, the common field of the EHT-SIG and the user-specific field of the EHT-SIG may be coded separately. One user block field included in the user-specific field may contain information for two user fields, but the last user block field included in the user-specific field may contain one or two user fields. That is, one user block field of the EHT-SIG may contain up to two user fields. As in the example of FIG. 12, each user field may be related to MU-MIMO allocation or non-MU-MIMO allocation.

In the same way as in the example of FIG. 11, the common field of the EHT-SIG may include a CRC bit and a Tail bit, The length of the CRC bit may be determined as 4 bits, and the length of the tail bit is determined by 6 bits and may be set to 000000.

As in the example of FIG. 11, the common field of the EHT-SIG may include RU allocation information. RU allocation information may mean information on the location of an RU to which a plurality of users (i.e., a plurality of receiving STAs) are allocated. RU allocation information may be configured in units of 9 bits (or N bits).

A mode in which a common field of EHT-SIG is omitted may be supported. The mode in which the common field of the EHT-SIG is omitted may be referred as a compressed mode. When the compressed mode is used, a plurality of users (i.e., a plurality of receiving STAs) of the EHT PPDU may decode the PPDU (e.g., the data field of the PPDU) based on non-OFDMA. That is, a plurality of users of the EHT PPDU may decode a PPDU (e.g., a data field of the PPDU) received through the same frequency band. When a non-compressed mode is used, multiple users of the EHT PPDU may decode the PPDU (e.g., the data field of the PPDU) based on OFDMA. That is, a plurality of users of the EHT PPDU may receive the PPDU (e.g., the data field of the PPDU) through different frequency bands.

EHT-SIG may be constructed based on various MCS scheme. As described above, information related to the MCS scheme applied to the EHT-SIG may be included in the U-SIG. The EHT-SIG may be constructed based on the DCM scheme. The DCM scheme may reuse the same signal on two subcarriers to provide an effect similar to frequency diversity, reduce interference, and improve coverage. For example, modulation symbols to which the same modulation scheme is applied may be repeatedly mapped on available tones/subcarriers.

For example, modulation symbols (e.g., BPSK modulation symbols) to which a specific modulation scheme is applied may be mapped to first contiguous half tones (e.g., 1st to 26th tones) among the N data tones (e.g., 52 data tones) allocated for EHT-SIG, and modulation symbols (e.g., BPSK modulation symbols) to which the same specific modulation scheme is applied may be mapped to the remaining contiguous half tones (e.g., 27th to 52nd tones). That is, a modulation symbol mapped to the 1st tone and a modulation symbol mapped to the 27th tone are the same. As described above, information related to whether the DCM scheme is applied to the EHT-SIG (e.g., a 1-bit field) may be included in the U-SIG. The EHT-STF of FIG. 13 may be used to enhance automatic gain control (AGC) estimation in a MIMO environment or an OFDMA environment. The EHT-LTF of FIG. 13 may be used to estimate a channel in a MIMO environment or an OFDMA environment.

Information on the type of STF and/or LTF (including information on a guard interval (GI) applied to LTF) may be included in the U-SIG field and/or the EHT-SIG field of FIG. 13.

The PPDU (i.e., EHT PPDU) of FIG. 13 may be constructed based on an example of RU allocation of FIGS. 8 to 10.

For example, a EHT PPDU transmitted on a 20 MHz band, that is, a 20 MHz EHT PPDU may be constructed based on the RU of FIG. 8. That is, a RU location of EHT-STF, EHT-LTF, and data field included in the EHT PPDU may be determined as shown in FIG. 8. A EHT PPDU transmitted on a 40 MHz band, that is, a 40 MHz EHT PPDU may be constructed based on the RU of FIG. 9. That is, a RU location of EHT-STF, EHT-LTF, and data field included in the EHT PPDU may be determined as shown in FIG. 9.

The EHT PPDU transmitted on the 80 MHz band, that is, the 80 MHz EHT PPDU may be constructed based on the RU of FIG. 10. That is, a RU location of EHT-STF, EHT-LTF, and data field included in the EHT PPDU may be determined as shown in FIG. 10. The tone-plan for 80 MHz in FIG. 10 may correspond to two repetitions of the tone-plan for 40 MHz in FIG. 9.

The tone-plan for 160/240/320 MHz may be configured in the form of repeating the pattern of FIG. 9 or 10 several times.

The PPDU of FIG. 13 may be identified as an EHT PPDU based on the following method.

The receiving STA may determine the type of the received PPDU as the EHT PPDU based on the following. For example, when 1) the first symbol after the L-LTF signal of the received PPDU is BPSK, 2) RL-SIG in which the L-SIG of the received PPDU is repeated is detected, and 3) the result of applying the modulo 3 calculation to the value of the Length field of the L-SIG of the received PPDU (i.e., the remainder after dividing by 3) is detected as 0, the received PPDU may be determined as a EHT PPDU. When the received PPDU is determined to be an EHT PPDU, the receiving STA may determine the type of the EHT PPDU based on bit information included in symbols subsequent to the RL-SIG of FIG. 13. In other words, the receiving STA may determine the received PPDU as a EHT PPDU, based on 1) the first symbol after the L-LTF signal, which is BSPK, 2) RL-SIG contiguous to the L-SIG field and identical to the L-SIG, and 3) L-SIG including a Length field in which the result of applying modulo 3 is set to 0.

For example, the receiving STA may determine the type of the received PPDU as the HE PPDU based on the following. For example, when 1) the first symbol after the L-LTF signal is BPSK, 2) RL-SIG in which L-SIG is repeated is detected, and 3) the result of applying modulo 3 to the length value of L-SIG is detected as 1 or 2, the received PPDU may be determined as a HE PPDU.

For example, the receiving STA may determine the type of the received PPDU as non-HT, HT, and VHT PPDU based on the following. For example, when 1) the first symbol after the L-LTF signal is BPSK and 2) RL-SIG in which L-SIG is repeated is not detected, the received PPDU may be determined as non-HT, HT, and VHT PPDU.

In addition, when the receiving STA detects an RL-SIG in which the L-SIG is repeated in the received PPDU, it may be determined that the received PPDU is a HE PPDU or an EHT PPDU. In this case, if the rate (6 Mbps) check fails, the received PPDU may be determined as a non-HT, HT, or VHT PPDU. If the rate (6 Mbps) check and parity check pass, when the result of applying modulo 3 to the Length value of L-SIG is detected as 0, the received PPDU may be determined as an EHT PPDU, and when the result of Length mod 3 is not 0, it may be determined as a HE PPDU.

The PPDU of FIG. 13 may be used to transmit and receive various types of frames. For example, the PPDU of FIG. 13 may be used for (simultaneous) transmission and reception of one or more of a control frame, a management frame, or a data frame.

Aggregate MPDU (A-MPDU)

Figure 14:
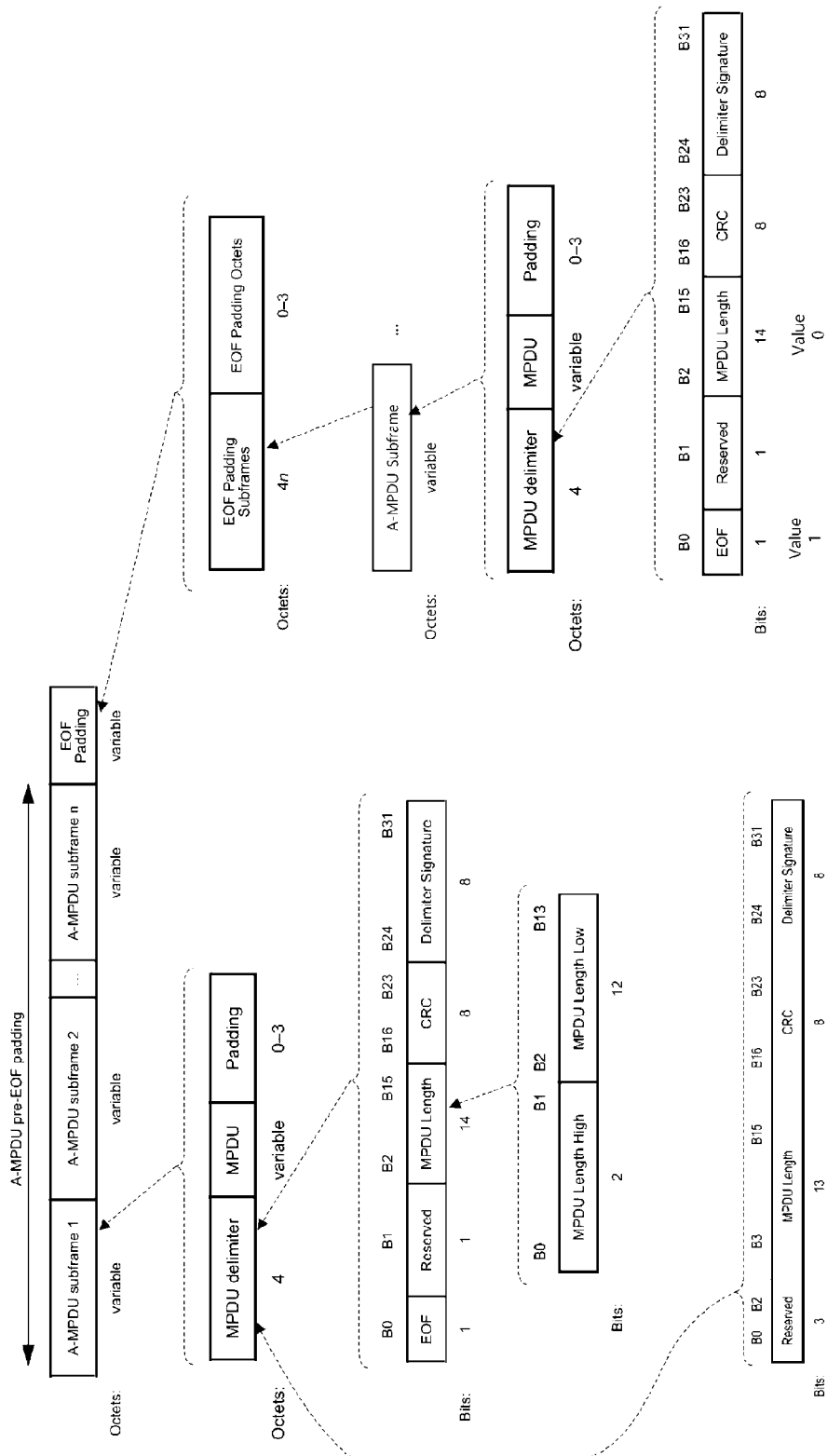
FIG. 14 is a diagram illustratively showing an A-MPDU format to which the present disclosure may be applied.

FIG. 14 is a diagram illustratively showing an A-MPDU format to which the present disclosure may be applied.

An A-MPDU consists of at least one A-MPDU subframe and end-of-frame (EOF) padding of a variable length. Each A-MPDU subframe includes a MPDU delimiter and may further include a subsequent MPDU. A non-final A-MPDU subframe within one A-MPDU has a padding octet added to have a length that is a multiple of 4 octets.

An EOF padding subframe subfield may include an EOF padding subframe equal to or greater than 0. An EOF padding subframe is an A-MPDU subframe in which a value of a MPDU length field is configured as 0 and a value of an EOF field is configured as 1. A-MPDU pre-EOF padding does not include an EOF padding field and refers to a content up to an EOF padding field.

The maximum length of an A-MPDU in a HT PPDU is 65 535 octets. The maximum length of an A-MPDU in a directional multi-gigabit (DMG) PPDU is 262 143 octets. The maximum length of A-MPDU pre-EOF padding in a VHT PPDU is 1 048 575 octets. The maximum length of A-MPDU pre-EOF padding in a HE PPDU is 6 500 631 octets. A length of an A-MPDU addressed to a specific STA may be further limited.

Table 1 includes a description for a subfield of a MPDU delimiter field. For example, a MPDU delimiter for a non-DMG may include a 1-bit EOF/Tag subfield and a 14-bit MPDU length subfield.

TABLE 1

| Field | Size (bits) | Description |
|---|---|---|
| BOF/Tag | 1 | End of frame indication if the MPDU Length field is 0. Set to 1 in an A-MPDU subframe that has 0 in the MPDU Length field and that is used to pad the A-MPDU in a VHT or HE PPDU as described in 10.12.6 (A-MPDU padding for VHT, HE(11ax) or SIG PPDU). Set to 1 in the MPDU delimiter of an S-MPDU as described in 10.12.7 (Setting the EOF/Tag(11ax) field of the MPDU delimiter). Tagged/untagged indication if the MPDU Length field is nonzero. Set to 1 in an MPDU delimiter preceding a QoS Data frame or Management frame soliciting an Ack frame or Per AID TID Info field with the Ack Type field set to 1 in a Multi-STA BlockAck frame in a response that is contained in an ack-enabled multi-TID A-MPDU as described in 26.6.3.4 (Ack-enabled multi-TID A-MPDU operation)and ack-enabled single-TID A-MPDU as described in 26.6.3.2 (Ack-enabled single-TID A-MPDU operation). Set to 0 otherwise. In a DMG PPDU, this field is reserved. In an EDMG PPDU, it is set to 1 in EOF padding subframes and set to 0 otherwise (see 10.12.7 (Setting the EOF/Tag(11ax) field of the MPDU delimiter)). |
| Reserved | 1 | |
| MPDU Length | 14 | Length of the MPDU in octets. Set to 0 if no MPDU is present. An A-MPDU subframe with 0 in the MPDU Length field is used as defined in 10.12.3 (Minimum MPDU start spacing rules) to meet the minimum MPDU start spacing requirement and also to pad the A-MPDU to fill the available octets in a VHT or HE PPDU as defined in 10.12.6 (A-MPDU padding for VHT, HE(11ax) or SIG PPDU). |

TABLE 1-continued

| Field | Size (bits) | Description |
|---|---|---|
| CRC | 8 | 8-bit CRC of the preceding 16 bits. |
| Delimiter Signature | 8 | Pattern that can be used to detect an MPDU delimiter when scanning for an MPDU delimiter. The unique pattern is 0x4E, which is the ASCII value of the character "N". |

A 14-bit MPDU length field transmitted by a non-DMG STA may include a MPDU length high and MPDU length low subfield. A MPDU length low subfield includes 12 low order bits of a MPDU length. In a VHT or HE PPDU, a MPDU length high subfield includes 2 high order bits of a MPDU length. In a HT PPDU, a MPDU length high subfield is reserved.

A MPDU delimiter field for a DMG does not include an EOF/Tag subfield and may include a 13-bit MPDU length subfield.

In other words, when a length of a MPDU is $L_{MPDU}$, a value of a MPDU length high subfield is $L_{high}$, a value of a MPDU length low subfield is $L_{low}$ and a value of a 13-bit MPDU length subfield is L: It is $L_{MPDU}=L_{low}+L_{high}*4096$ for a VHT or HE PPDU; it is $L_{MPDU}=L_{low}$ for a HT PPDU; and it is $L_{MPDU}=L$ for a DMG PPDU.

Capability information related to an A-MPDU or MPDU length is described below.

Capability information may be included in a management frame transmitted/received by a STA. (e.g., a beacon frame, a (re)association request/response frame, a probe request/response frame, etc.).

A VHT capability information field may include a 2-bit maximum MPDU length subfield (a bit position: B0-B1), and a 3-bit maximum A-MPDU length exponent subfield (B23-B25). A maximum MPDU length subfield shows the maximum MPDU length which may be received by a STA, and a value of 0 may show 3895 octets, a value of 1 may show 7991 octets and a value of 2 may show 11 454 octets, etc. A maximum A-MPDU length exponent subfield shows the maximum length of A-MPDU pre-EOF padding which may be received by a STA, and a length value defined by a corresponding field is $2^{(13+value\ of\ corresponding\ field)}-1$ octets.

A S1G (sub-1 GHz) capability information field may include a 1-bit maximum MPDU length subfield (B26) and a 2-bit maximum A-MPDU length exponent subfield (B27-B28). A maximum MPDU length subfield shows the maximum MPDU length, and a value of 0 may show 3895 octets and a value of 1 may show 7991 octets. A maximum A-MPDU length exponent subfield shows the maximum length of an A-MPDU which may be received by a STA, EOF padding is not included in that limit, and a length value defined by a corresponding field is $2^{(13+value\ of\ corresponding\ field)}-1$ octets.

A HE capability information field may include a 2-bit maximum A-MPDU length exponent extension subfield (B27-B28). A maximum A-MPDU length exponent subfield shows an extension value of the maximum length of an A-MPDU supported in reception.

A HE 6 GHz band capability element includes a 3-bit maximum A-MPDU length exponent subfield (B3-B5) and a 2-bit maximum MPDU length subfield (B6-B7).

Hereinafter, an A-MPDU length limit rule is described.

A STA may show the maximum A-MPDU length that it may receive in an HT PPDU in a maximum A-MPDU length exponent field of a HT capability element. A STA may show the maximum length of A-MPDU pre-EOF padding that it may receive in a VHT PPDU in a maximum A-MPDU length exponent field of a VHT capability element. A STA may show the maximum length of A-MPDU pre-EOF padding that it may receive in a S1G PPDU in a maximum A-MPDU length exponent field of a S1G capability element. A STA may show the maximum length of an A-MPDU that it may receive in a DMG PPDU in a maximum A-MPDU length exponent field of a DMG capability element. A STA may show the maximum length of A-MPDU pre-EOF padding that it may receive in a HE PPDU in a maximum A-MPDU length field of a HT capability, a VHT capability and (if present) a HE 6 GHz band capability, and a maximum A-MPDU length exponent extension field of a HE capability element.

A VHT STA that configures a maximum A-MPDU length exponent field of a VHT capability as a value in a scope of 0 to 3 also configures a maximum A-MPDU length exponent field of a HT capability as the same value. A VHT STA that configures a maximum A-MPDU length exponent field of a VHT capability as a value exceeding 3 configures a maximum A-MPDU length exponent field of a HT capability as a value of 3.

A STA may use a maximum A-MPDU length exponent of a HT capability, a VHT capability, a HE capability, and (if present) a HE 6 GHz band capability to establish the maximum length of A-MPDU pre-EOF padding it may transmit in an association process. A HT STA may receive A-MPDUs of a length up to a value indicated by a maximum A-MPDU length exponent field of its HT capability element. A VHT STA may receive A-MPDUs having A-MPDU pre-EOF padding of a length up to a value indicated by a maximum A-MPDU length exponent field of its VHT capability element. A SIG STA that configures a value of an A-MPDU support subfield as 1 in a SIG capability element may receive A-MPDUs having A-MPDU pre-EOF padding of a length up to a value indicated by a maximum A-MPDU length exponent field of its SIG Capability element.

In a 2.4 GHz or 5 GHz band, a HE STA may receive A-MPDUs having A-MPDU pre-EOF padding of a length up to a value indicated by a maximum A-MPDU length exponent field of its HT capability and VHT capability, and a maximum A-MPDU length exponent extension field of its HE capability element. In a 6 GHz band, a HE STA may receive A-MPDUs having A-MPDU pre-EOF padding of a length up to a value indicated by a maximum A-MPDU length exponent field of its HT capability element, and a maximum A-MPDU length exponent field of its HE 6 GHz band capability element.

A STA does not transmit in a HT PPDU an A-MPDU longer than a value indicated by a maximum A-MPDU length exponent field of a HT capability element received from an intended receiving end. MPDUs of an A-MPDU carried in a HT PPDU are limited to the maximum length of 4095 octets. A STA does not transmit in a VHT PPDU an A-MPDU having A-MPDU pre-EOF padding longer than a value indicated by a maximum A-MPDU length exponent field of a VHT capability element received from an intended receiving end. A STA does not transmit in a SIG PPDU an A-MPDU having A-MPDU pre-EOF padding longer than a value indicated by a maximum A-MPDU length exponent field of a S1G capability element received from an intended receiving end. A STA does not transmit in a DMG PPDU an A-MPDU longer than a value indicated by a maximum A-MPDU length exponent field of a DMG capability element received from an intended receiving end.

In a 2.4 GHz or 5 GHz band, a STA does not transmit in a HE PPDU an A-MPDU having a length of A-MPDU pre-EOF padding larger than a value indicated by a maximum A-MPDU length exponent field of a HT capability element and a VHT capability element, and a maximum A-MPDU length exponent extension field of a HE capability element received from an intended receiving end. In a 6 GHz band, a STA does not transmit in a HE PPDU A-MPDUs having a length of A-MPDU pre-EOF padding larger than a value indicated by a maximum A-MPDU length exponent extension field of a HT capability element, and a maximum A-MPDU length exponent field of a HE 6 GHz band capability element received from an intended receiving end.

Excluding a S-MPDU (a single-MPDU), when receiving a frame including a SiG capability element that a value of an A-MPDU support subfield is configured as 0 from another S1G STA, a S1G STA does not transmit an A-MPDU to another corresponding S1G STA.

Hereinafter, an A-MPDU operation in a HE PPDU is described in more detail.

In order to indicate a maximum length value of an A-MPDU within a HE PPDU, a STA may use a maximum A-MPDU length exponent extension subfield of a HE MAC Capability Information field. A value of a corresponding maximum A-MPDU length exponent extension subfield may be configured by considering the following matters.

A HE STA that transmits a class 1 frame or a class 2 frame in a HE PPDU transmits a frame as a S-MPDU.

A HE STA that transmits a VHT capability element, a HT capability element, or a HE 6 GHz band capability element, and additionally transmits a HE capability element including a maximum A-MPDU length exponent extension field with a value of 0 supports reception of an A-MPDU having A-MPDU pre-EOF padding less than or equal to the maximum value based on exponent information of a VHT capability element or exponent information of a HE 6 GHz band capability element as described above.

An HE STA which transmits a VHT capabilities element, an HE capabilities element having a maximum A-MPDU length exponent extension field with a value greater than 0 supports a reception of an HE PPDU with A-MPDU pre-EOF padding as described above, based on a maximum length for A-MPDU pre-EOF padding equal to $\min(2^{(20+maximum\ A\text{-}MPDU\ length\ exponent\ extension)}-1, 6\ 500\ 631)$. An HE STA that sets a maximum A-MPDU length exponent extension subfield of the HE capabilities element to a value greater than 0, may set a maximum A-MPDU length exponent subfield of the VHT capabilities to 7. Here, the value of 6 500 631 may correspond to an upper limit of A-MPDU size of an EHT PPDU.

A HE STA that does not transmit a VHT capability element, but transmits a HT capability element having a maximum A-MPDU length exponent extension field with a value exceeding 0, as described above, supports reception of a HE PPDU having A-MPDU pre-EOF padding based on the maximum length of A-MPDU pre-EOF padding equal to $2^{(16+maximum\ A\text{-}MPDU\ length\ exponent\ extension)}-1$. A HE STA that configures a maximum A-MPDU length exponent extension subfield of a HE capability element as a value exceeding 0 configures a value of a maximum A-MPDU length exponent subfield of a HT capability as 3. Here, a HE STA, which is a VHT STA, transmits a VHT capability element and a HE STA, which is not a VHT STA, does not transmit a VHT capability element.

An HE STA which transmits an HE 6 GHz band capabilities element, an HE capabilities element having a maximum A-MPDU length exponent extension field with a value greater than 0 supports a reception of an HE PPDU with A-MPDU pre-EOF padding as described above, based on a maximum length for A-MPDU pre-EOF padding equal to $\min(2^{(20+maximum\ A\text{-}MPDU\ length\ exponent\ extension)}-1, 6\ 500\ 631)$. An HE STA that sets a maximum A-MPDU length exponent extension subfield of the HE capabilities element to a value greater than 0, may set a maximum A-MPDU length exponent subfield of the HE 6 GHz band capabilities to 7.

A HE STA does not transmit in a corresponding STA an A-MPDU that exceeds the maximum A-MPDU length indicated in a HE Capability element, a VHT Capability element, and a HT Capability element received from a receiving STA in a HE PPDU. When a VHT capability element is received from a receiving end's STA, a maximum A-MPDU length capability is derived from a maximum A-MPDU length exponent extension subfield of a HE capability element and a maximum A-MPDU length exponent subfield of a VHT capability element. Otherwise (i.e., when a VHT capability element is not received), a maximum A-MPDU length capability is derived from a maximum A-MPDU length exponent extension subfield of a HE capability element and a maximum A-MPDU length exponent subfield of a HT capability element or a HE 6 GHz band capability element.

Maximum Length of A-MPDU in EHT PPDU

The present disclosure describes examples of signaling/indicating information on a maximum length of an A-MPDU or a maximum length value of A-MPDU pre-EOF padding that may be transmitted/received by an EHT STA in an EHT PPDU.

The maximum length (i.e., the maximum length of A-MPDU pre-EOF padding) that may be received by a STA excluding EOF padding within a EHT PPDU corresponds to 15 523 200 octets. Compared to the maximum length of an A-MPDU that may be received excluding EOF padding in a VHT PPDU and a HE PPDU being 1 048 575 octets and 6 500 631 octets, respectively, the maximum length of an A-MPDU in an EHT PPDU increased. Accordingly, new information (e.g., a field/a subfield) used to indicate/derive a maximum length value of an A-MPDU (or A-MPDU pre-EOF padding) that may be received by a STA within an EHT PPDU is required.

FIG. 15 is a diagram showing illustrative formats of an EHT MAC capability information field according to the present disclosure.

FIG. 15(a) shows examples of subfields included in an EHT MAC Capabilities Information field and some of corresponding subfields may be changed/excluded or an additional subfield may be further included. Here, there is no information or subfield that may be used to indicate/derive a maximum length value of an A-MPDU (or A-MPDU pre-EOF padding) within an EHT PPDU in an EHT MAC capability information field. Accordingly, it is required to define new information/subfield therefor.

According to the present disclosure, a new subfield related to the maximum length of an A-MPDU (or A-MPDU pre-EOF padding) in an EHT PPDU that may be received by a STA may be defined in an EHT MAC Capabilities Information field. A corresponding new subfield may be referred to as Maximum A-MPDU Length Exponent Extension, but a scope of the present disclosure is not limited thereto. Based on/by using a new subfield, a STA may indicate/derive the maximum length of an A-MPDU (or A-MPDU pre-EOF padding) that may be transmitted/received within an EHT PPDU.

An EHT STA may indicate/derive the maximum length of A-MPDU pre-EOF padding that may be transmitted/received within an EHT PPDU through a value of a Maximum A-MPDU Length Exponent Extension subfield within a HE Capabilities element and an EHT Capabilities element and a Maximum A-MPDU Length Exponent field within a HT Capabilities element, a VHT Capabilities element, and (if present) a HE 6 GHz Band Capabilities element. In other words, a corresponding STA may not transmit a A-MPDU having a length of A-MPDU pre-EOF padding exceeding the value by including it in an EHT PPDU.

In a HE WLAN system, a HE 6 GHz Capabilities element representing MAC Capabilities of STAs operating in a 6 GHz band is defined. In a 2.4 GHz and 5 GHz band, based on a Maximum A-MPDU Length Exponent subfield of a VHT Capabilities element and a HT Capabilities element, and in a 6 GHz band, based on a Maximum A-MPDU Length Exponent subfield of a HE 6 GHz Capabilities element, the maximum length extended by a value of a Maximum A-MPDU Length Exponent Extension subfield of a HE Capabilities element may be indicated/derived.

For an EHT PPDU, a maximum length value of an A-MPDU (or A-MPDU pre-EOF padding) extended through a value of a Maximum A-MPDU Length Exponent Extension subfield within an EHT Capabilities element may be indicated/derived in a band from 2.4 GHz to 6 GHz.

For example, for a 2.4 GHz or 5 GHz band, an EHT STA may define and use a Maximum A-MPDU Length Exponent field within a HT Capabilities element and a VHT Capabilities element, and a Maximum A-MPDU Length Exponent Extension field of a HE Capabilities element and an EHT Capabilities element. For a 6 GHz band, an EHT STA may define and use a Maximum A-MPDU Length Exponent field within a HE 6 GHz Capabilities element, and a Maximum A-MPDU Length Exponent Extension field within a HE Capabilities element and an EHT Capabilities element.

Based thereon, an EHT STA may derive/indicate that it may transmit/receive A-MPDU(s) having A-MPDU pre-EOF padding of a length up to a value determined based on corresponding (sub)fields. An EHT STA may not transmit/receive A-MPDU(s) having A-MPDU pre-EOF padding of a length longer than a value determined based on corresponding (sub)fields.

Figure 16:
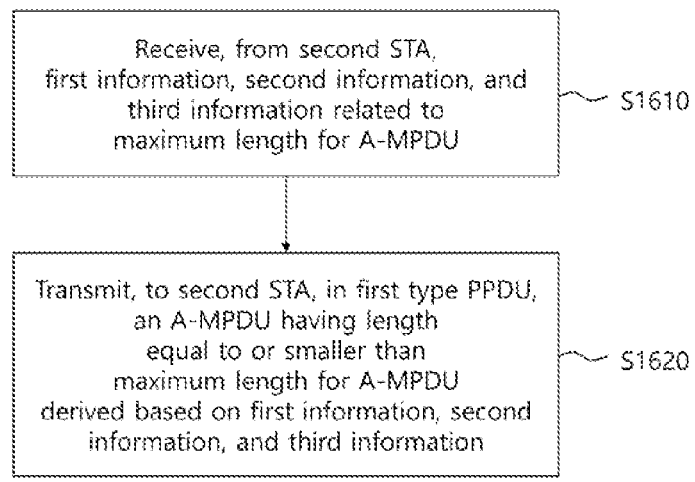
FIG. 16 is a diagram for describing an example of an A-MPDU transmission method according to the present disclosure.

FIG. 16 is a diagram for describing an example of an A-MPDU transmission method according to the present disclosure.

In S1610, a first STA may receive first information, second information, and third information related to the maximum length for an A-MPDU from a second STA.

For example, one of first information, second information, and third information may be information of a different purpose/type than the other two. For example, one may be exponent information and the other two may be exponent extension information.

For example, first information may correspond to a maximum A-MPDU length exponent subfield of a VHT capability element or a maximum A-MPDU length exponent subfield of a HE 6 GHz band capability element. For example, second information and third information may correspond to a maximum A-MPDU length exponent extension subfield of a HE capability element and a maximum A-MPDU length exponent extension subfield of an EHT capability element, respectively.

The first STA may receive a plurality of exponent information from a second STA, but may derive the maximum length for an A-MPDU described later based on one of a plurality of exponent information (e.g., information indicating a larger value). For example, a first STA may receive a maximum A-MPDU length exponent subfield of a HT capability element from a second STA, and in addition, may receive a maximum A-MPDU length exponent subfield of a VHT capability element or a maximum A-MPDU length exponent subfield of a HE 6 GHz band capability element, and among them, it may determine/use as first information a maximum A-MPDU length exponent subfield of a VHT capability element or a maximum A-MPDU length exponent subfield of a HE 6 GHz band capability element.

For example, the maximum length for the A-MPDU may be the maximum length of A-MPDU pre-EOF padding.

In S1620, a first STA may transmit to a second STA an A-MPDU having a length less than or equal to the maximum length for an A-MPDU derived based on first information, second information, and third information in a first type PPDU.

For example, first information may have a value exceeding 0 and first and second information may be configured as the maximum value, respectively. For example, the maximum value of first information may be 7, and the maximum value of second information may be 3.

In this case, the maximum length for an A-MPDU is $\min(2^{(23+M)}-1, 15\,523\,200)$, and here, M is a value of third information and $\min(x,y)$ refers to the minimum value between x and y.

For example, third information may be defined as a 1-bit size.

For example, a first type PPDU may be an EHT PPDU.

For example, based on a value of third information being 0, an A-MPDU having a length less than or equal to the maximum length for the A-MPDU derived based on first and second information may be transmitted to the second STA in the first type PPDU.

For example, in a second type PPDU, an A-MPDU having a length less than or equal to the maximum length for the A-MPDU derived based on first and second information in the first type PPDU may be transmitted to the second STA. For example, a second type PPDU may be a HE PPDU.

In this case, first information is configured as the maximum value of 7, the maximum length for an A-MPDU is $\min(2^{(20+N)}-1, 6\,500\,631)$, and N may be a value exceeding 0 of second information.

A first STA does not transmit an A-MPDU having an A-MPDU A-MPDU pre-EOF padding length larger than the maximum length for an A-MPDU derived based on first information, second information, and/or third information received from a second STA in a first type PPDU or a second type PPDU.

Figure 17:
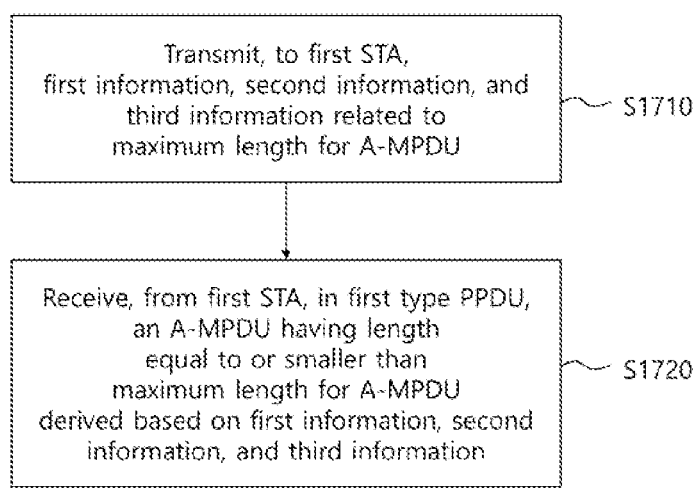
FIG. 17 is a diagram for describing an example of an A-MPDU reception method according to the present disclosure.

FIG. 17 is a diagram for describing an example of an A-MPDU reception method according to the present disclosure.

In S1710, a second STA may transmit first information, second information, and third information related to the maximum length for an A-MPDU to a first STA.

For a specific example for the maximum length for an A-MPDU, first information, second information, and third information, matters described by referring to S1610 of FIG. 16 is equally applied, so an overlapping description is omitted.

In S1720, a second STA may receive from a first STA an A-MPDU having a length less than or equal to the maximum length for an A-MPDU indicated based on first information, second information, and third information in a first type PPDU.

For a specific example for the maximum length for an A-MPDU related to a PPDU type, first information, second information, and third information, matters described by referring to S1620 of FIG. 16 is equally applied, so an overlapping description is omitted.

A second STA may supporting receiving an A-MPDU having A-MPDU A-MPDU pre-EOF padding length less than or equal to the maximum length for an A-MPDU indicated based on first information, second information, and/or third information transmitted to a first STA in a first type PPDU or a second type PPDU.

Hereinafter, specific embodiments related to a Maximum A-MPDU Length Exponent Extension subfield (hereinafter, a new extension subfield), a new subfield within an EHT MAC Capabilities Information field, involved in indicating/deriving information on the maximum length of an A-MPDU (or A-MPDU pre-EOF padding) that may be transmitted/received by an EHT STA.

Embodiment 1

A new extension subfield according to the present embodiment may be defined as 1-bit size as shown in FIG. 15(b). A bit position of FIG. 15(b) is exemplary and does not limit the scope of the present disclosure.

When the maximum length of an A-MPDU (or A-MPDU pre-EOF padding) that may be transmitted/received by a corresponding STA is less than or equal to 6 500 531 octets (i.e., the maximum length of an A-MPDU (or A-MPDU pre-EOF padding) allowed in a HE PPDU), a new extension subfield has a value of 0. When a new extension subfield has a value exceeding 0 (or a value of 1), it may mean that the maximum length of an A-MPDU (or A-MPDU Pre-EOF padding) that may be received by an EHT STA is 15 523 200 octets.

Embodiment 2

A new extension subfield according to this embodiment may be defined as a 3-bit size as in FIG. 15(c). A bit position in FIG. 15(c) is exemplary, and does not limit a scope of the present disclosure.

When a maximum A-MPDU length exponent extension subfield of a HE capability element has a value of 0 to 3, a value of a maximum A-MPDU length exponent extension subfield of an EHT capability element may have the same value (i.e., 0 to 3) as a value of a maximum A-MPDU length exponent extension subfield of a HE capability element.

When a value of a maximum A-MPDU length exponent extension subfield of an EHT capability element has a value greater than 3, a value of a maximum A-MPDU length exponent extension subfield of a HE capability element is 3, which may mean 6 500 631 octets.

A rule related to a new extension subfield according to the present disclosure (e.g., a maximum A-MPDU length exponent extension subfield of an EHT capability element) is as follows.

In common with embodiments 1 and 2, an EHT STA does not transmit an A-MPDU exceeding a maximum A-MPDU length capability indicated by an EHT capability element, a HE capability element, a VHT capability element, and a HT capability element received from a receiving side's STA to a corresponding receiving STA in an EHT PPDU. When a VHT capability element is received from a receiving end's STA, a maximum A-MPDU length capability is derived from a maximum A-MPDU length exponent extension subfield of a HE capability element and an EHT capability element, and a maximum A-MPDU length exponent subfield of a VHT capability element. Otherwise (i.e., when a VHT capability element is not received), a maximum A-MPDU length capability is derived from a maximum A-MPDU length exponent extension subfield of a HE capability element and an EHT capability element, and a maximum A-MPDU length exponent subfield of a HT capability element or a HE 6 GHz band capability element.

In common with embodiments 1 and 2, an EHT STA that transmits a VHT capability element, a HT capability element, or a HE 6 GHz band capability element, and additionally transmits a HE capability element including a maximum A-MPDU length exponent extension field with a value of 0 and an EHT capability element including a maximum A-MPDU length exponent extension field with a value of 0 supports reception of an A-MPDU having A-MPDU pre-EOF padding less than or equal to the maximum value based on exponent information of a VHT capability element or exponent information of a HE 6 GHz band capability element as described above.

In the embodiment 1, an EHT STA which transmits an VHT capabilities element, an HT capabilities element, or an HE 6 GHz band capabilities element, and additionally an HE capabilities element including a maximum A-MPDU length exponent extension with a value greater than 0 and an EHT capabilities element including a maximum A-MPDU length exponent extension with a value of 0 may support a reception of an A-MPDU having A-MPDU pre-EOF padding equal to or smaller than a maximum value based on the exponent information of the VHT capabilities element or the exponent information of the HE 6 GHz band capabilities element, and the exponent extension information of the HE capabilities element.

In the embodiment 1, an EHT STA which transmits a VHT capabilities element, an HE capabilities element, and an EHT capabilities element having a maximum A-MPDU length exponent extension field with a value greater than 0 supports a reception of an EHT PPDU with A-MPDU pre-EOF padding as described above, based on a maximum length for A-MPDU pre-EOF padding equal to $\min(2^{(23+maximum\ A\text{-}MPDU\ length\ exponent\ extension)}-1, 15\ 523\ 200)$. An EHT STA that sets a maximum A-MPDU length exponent extension subfield of the EHT capabilities element to a value greater than 0, may set a maximum A-MPDU length exponent subfield of the VHT capabilities to 7, and may set a maximum A-MPDU length exponent extension subfield of the HE capabilities to 3. Here, the value of 15 523 200 may correspond to an upper limit of A-MPDU size of an EHT PPDU.

In Embodiment 1, an EHT STA that does not transmit a VHT capability element, but transmits a HT capability element, a HE capability element, and an EHT capability element having a maximum A-MPDU length exponent extension field with a value exceeding 0 supports reception of an EHT PPDU having A-MPDU pre-EOF padding as described above, based on the maximum length of A-MPDU pre-EOF padding equal to $2^{(19+maximum\ A\text{-}MPDU\ length\ exponent\ extension)}-1$. An EHT STA that configures a maximum A-MPDU length exponent extension subfield of an EHT capability element as a value exceeding 0 configures a value of a maximum A-MPDU length exponent subfield of a HT capability as 3 and configures a value of a maximum A-MPDU length exponent extension subfield of a HE capability as 3. Here, a EHT STA, which is a VHT STA, transmits a VHT capability element and a EHT STA, which is not a VHT STA, does not transmit a VHT capability element.

In the embodiment 1, an EHT STA which transmits an HE 6 GHz band capabilities element, an HE capabilities element, and an EHT capabilities element having a maximum A-MPDU length exponent extension field with a value greater than 0 supports a reception of an EHT PPDU with A-MPDU pre-EOF padding as described above, based on a maximum length for A-MPDU pre-EOF padding equal to $\min(2^{(23+maximum\ A\text{-}MPDU\ length\ exponent\ extension)} - 1 5\ 523\ 200)$. An EHT STA that sets a maximum A-MPDU length exponent extension subfield of the EHT capabilities element to a value greater than 0, may set a maximum A-MPDU length exponent subfield of the HE 6 GHz band capabilities to 7, and may set a maximum A-MPDU length exponent extension subfield of the HE capabilities to 3.

In Embodiment 2, an EHT STA that transmits a VHT capability element, and an EHT capability element having a maximum A-MPDU length exponent extension field with a value exceeding 0 and does not include/transmit a HE capability element supports reception of an EHT PPDU having A-MPDU pre-EOF padding as described above, based on the maximum length of A-MPDU pre-EOF padding equal to $\min(2^{(20+maximum\ A\text{-}MPDU\ length\ exponent\ extension)} - 1, 15\ 523\ 200)$. An EHT STA that configures a maximum A-MPDU length exponent extension subfield of an EHT capability element as a value exceeding 0 configures a value of a maximum A-MPDU length exponent subfield of a VHT capability as 7. Here, a value of 15 523 200 may correspond to an upper limit of an A-MPDU size of an EHT PPDU.

In Embodiment 2, an EHT STA that transmits a VHT capability element, a HE capability element, and an EHT capability element having a maximum A-MPDU length exponent extension field of a value exceeding 0 supports reception of an EHT PPDU having A-MPDU pre-EOF padding as described above, based on the maximum length of A-MPDU pre-EOF padding equal to $\min(2^{(23+maximum\ A\text{-}MPDU\ length\ exponent\ extension)} - 1, 15\ 523\ 200)$. An EHT STA that configures a maximum A-MPDU length exponent extension subfield of an EHT capability element as a value exceeding 0 configures a value of a maximum A-MPDU length exponent subfield of a VHT capability as 7. An EHT STA that configures a maximum A-MPDU length exponent extension subfield of an EHT capability element as a value exceeding 0 configures a value of a maximum A-MPDU length exponent extension subfield of an EHT capability element and a value of a maximum A-MPDU length exponent extension subfield of a HE capability element as the same value (e.g., 1 to 3). When an EHT STA configures a value of a maximum A-MPDU length exponent extension subfield of an EHT capability element as a value exceeding 3, a value of a maximum A-MPDU length exponent extension subfield of a HE capability element is configured as 3, which may mean 6 500 631, an upper limit of an A-MPDU size of a HE PPDU. In more detail, for a value of maximum A-MPDU length exponent extension in an equation of $\min(2^{(23+maximum\ A\text{-}MPDU\ length\ exponent\ extension)} - 1, 15\ 523\ 200)$ described above, when a value of a maximum A-MPDU length exponent extension subfield of an EHT capability element (a first exponent extension value) exceeds 3, a difference value from 3, a value of a maximum A-MPDU length exponent extension subfield of a HE capability element (a second exponent extension value), (i.e., a value obtained by subtracting 3 from a first exponent extension value or a value obtained by subtracting a second exponent extension value from a first exponent extension value) may be applied.

In Embodiment 2, an EHT STA that does not transmit a VHT capability element, but transmits a HT capability element, and does not transmit a HE capability element, but transmits an EHT capability element having a maximum A-MPDU length exponent extension field of a value exceeding 0 supports reception of an EHT PPDU having A-MPDU pre-EOF padding as described above, based on the maximum length of A-MPDU pre-EOF padding equal to $2^{(16+maximum\ A\text{-}MPDU\ length\ exponent\ extension)} - 1$. A EHT STA that configures a maximum A-MPDU length exponent extension subfield of a EHT capability element as a value exceeding 0 configures a value of a maximum A-MPDU length exponent subfield of a HT capability as 3. Here, a EHT STA, which is a VHT STA, transmits a VHT capability element and a EHT STA, which is not a VHT STA, does not transmit a VHT capability element.

In Embodiment 2, an EHT STA that does not transmit a VHT capability element, but transmits a HT capability element, and does not transmit a HE capability element, but transmits an EHT capability element having a maximum A-MPDU length exponent extension field of a value exceeding 0 supports reception of an EHT PPDU having A-MPDU pre-EOF padding as described above, based on the maximum length of A-MPDU pre-EOF padding equal to $2^{(19+maximum\ A\text{-}MPDU\ length\ exponent\ extension)} - 1$. An EHT STA that configures a maximum A-MPDU length exponent extension subfield of an EHT capability element as a value exceeding 0 configures a value of a maximum A-MPDU length exponent subfield of a HT capability as 3 and configures a value of a maximum A-MPDU length exponent extension subfield of a HE capability as the same value (e.g., 1 to 3) as a value of a maximum A-MPDU length exponent extension subfield of an EHT capability element. In more detail, for a value of maximum A-MPDU length exponent extension in an equation of $2^{(19+maximum\ A\text{-}MPDU\ length\ exponent\ extension)} - 1$ described above, when a value of a maximum A-MPDU length exponent extension subfield of an EHT capability element (a first exponent extension value) exceeds 3, a difference value from 3, a value of a maximum A-MPDU length exponent extension subfield of a HE capability element (a second exponent extension value), (i.e., a value obtained by subtracting 3 from a first exponent extension value or a value obtained by subtracting a second exponent extension value from a first exponent extension value) may be applied.

In Embodiment 2, an EHT STA that transmits a HE 6 GHz band capability element, and an EHT capability element having a maximum A-MPDU length exponent extension field with a value exceeding 0 and does not include/transmit a HE capability element supports reception of an EHT PPDU having A-MPDU pre-EOF padding as described above, based on the maximum length of A-MPDU pre-EOF padding equal to $\min(2^{(20+maximum\ A\text{-}MPDU\ length\ exponent\ extension)} - 1, 15\ 523\ 200)$. An EHT STA that configures a maximum A-MPDU length exponent extension subfield of an EHT capability element as a value exceeding 0 configures a value of a maximum A-MPDU length exponent subfield of a HE 6 GHz band capability as 7.

In Embodiment 2, an EHT STA that transmits a HE 6 GHz band capability element, a HE capability element, and an EHT capability element having a maximum A-MPDU length exponent extension field with a value exceeding 0 supports reception of an EHT PPDU having A-MPDU pre-EOF padding as described above, based on the maximum length of A-MPDU pre-EOF padding equal to $\min(2^{(23+\text{maximum A-MPDU length exponent extension})}-1, 15\ 523\ 200)$. An EHT STA that configures a maximum A-MPDU length exponent extension subfield of an EHT capability element as a value exceeding 0 configures a value of a maximum A-MPDU length exponent subfield of a HE 6 GHz band capability as 7. An EHT STA that configures a maximum A-MPDU length exponent extension subfield of an EHT capability element as a value exceeding 0 configures a value of a maximum A-MPDU length exponent extension subfield of an EHT capability element and a value of a maximum A-MPDU length exponent extension subfield of a HE capability element as the same value (e.g., 1 to 3). When an EHT STA configures a value of a maximum A-MPDU length exponent extension subfield of an EHT capability element as a value exceeding 3, a value of a maximum A-MPDU length exponent extension subfield of a HE capability element is configured as 3, which may mean 6 500 631, an upper limit of an A-MPDU size of a HE PPDU. In more detail, for a value of maximum A-MPDU length exponent extension in an equation of $\min(2^{(23+\text{maximum A-MPDU length exponent extension})}-1, 15\ 523\ 200)$ described above, when a value of a maximum A-MPDU length exponent extension subfield of an EHT capability element (a first exponent extension value) exceeds 3, a difference value from 3, a value of a maximum A-MPDU length exponent extension subfield of a HE capability element (a second exponent extension value), (i.e., a value obtained by subtracting 3 from a first exponent extension value or a value obtained by subtracting a second exponent extension value from a first exponent extension value) may be applied.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

A method proposed by the present disclosure is mainly described based on an example applied to an IEEE 802.11-based system, 5G system, but may be applied to various WLAN or wireless communication systems other than the IEEE 802.11-based system.

What is claimed is:

1. A method performed by a first station (STA) in a wireless local area network system, the method comprising:
    transmitting, to a second STA, first information, second information, and third information related to a maximum length for an aggregate-medium access control (MAC) protocol data unit (PDU) (A-MPDU); and
    receiving, from the second STA, in an extreme high throughput (EHT) physical layer PDU (PPDU), an A-MPDU having a length equal to or smaller than the maximum length for the A-MPDU calculated based on a value of the first information, a value of the second information, and a value of the third information,
    wherein the first information corresponds to a maximum A-MPDU length exponent subfield of a very high throughput (VHT) capabilities element, or a maximum A-MPDU length exponent subfield of a high efficiency (HE) 6 GHz band capabilities element,
    wherein the second information corresponds to a maximum A-MPDU length exponent extension subfield of an HE capabilities element,
    wherein the third information corresponds to a maximum A-MPDU length exponent extension subfield of an EHT capabilities element, and
    wherein the maximum length for the A-MPDU is a maximum length for the A-MPDU pre-end of frame (pre-EOF) padding.
2. The method according to claim 1, wherein:
    based on the maximum A-MPDU length exponent extension subfield of the EHT capabilities element having a value greater than 0, the maximum A-MPDU length exponent subfield of the VHT capabilities element, or the maximum A-MPDU length exponent subfield of the HE 6 GHz band capabilities element is set to a maximum value, and
the maximum A-MPDU length exponent extension subfield of the HE capabilities element is set to a maximum value.

3. The method according to claim 2, wherein:
the maximum value of the maximum A-MPDU length exponent subfield of the VHT capabilities element, or of the maximum A-MPDU length exponent subfield of the HE 6 GHz band capabilities element is 7, and
the maximum value of the maximum A-MPDU length exponent extension subfield of the HE capabilities element is 3.

4. The method according to claim 1, wherein:
the maximum length for the A-MPDU pre-EOF padding is $\min(2^{(23+M)}-1, 15\ 523\ 200)$,
where M is a value of the maximum A-MPDU length exponent extension subfield of the EHT capabilities element, and
$\min(x,y)$ denotes a minimum value of x and y.

5. The method according to claim 1, wherein:
the maximum A-MPDU length exponent extension subfield of the EHT capabilities element is defined as 1-bit size.

6. The method according to claim 1, further comprising:
receiving, from the second STA, in an HE PPDU, an A-MPDU having a length equal to or smaller than the maximum length for the A-MPDU pre-EOF padding calculated based on the value of the maximum A-MPDU length exponent subfield of the VHT capabilities element and the value of the maximum A-MPDU length exponent extension subfield of the HE capabilities element, or based on the value of the maximum A-MPDU length exponent subfield of the HE 6 GHz band capabilities element and the value of the maximum A-MPDU length exponent extension subfield of the HE capabilities element.

7. The method according to claim 6, wherein:
the value of the maximum A-MPDU length exponent subfield of the VHT capabilities element, or the value of the maximum A-MPDU length exponent subfield of the HE 6 GHz band capabilities element is set to 7 which is a maximum value,
the maximum length for the A-MPDU pre-EOF padding is $\min(2^{(20+N)}-1, 6\ 500\ 631)$,
where N is a value of the maximum A-MPDU length exponent extension subfield of the HE capabilities element greater than 0, and
$\min(x,y)$ denotes a minimum value of x and y.

8. A first station (STA) apparatus in a wireless local area network system, the apparatus comprising:
at least one transceiver; and
at least one processor connected to the at least one transceiver,
wherein the at least one processor is configured to:
transmit, through the at least one transceiver to a second STA, first information, second information, and third information related to a maximum length for an aggregate-medium access control (MAC) protocol data unit (PDU) (A-MPDU); and
receive, through the at least one transceiver from the second STA, in an extreme high throughput (EHT) physical layer PDU (PPDU), an A-MPDU having a length equal to or smaller than the maximum length for the A-MPDU calculated based on a value of the first information, a value of the second information, and a value of the third information,
wherein the first information corresponds to a maximum A-MPDU length exponent subfield of a very high throughput (VHT) capabilities element, or a maximum A-MPDU length exponent subfield of a high efficiency (HE) 6 GHz band capabilities element,
wherein the second information corresponds to a maximum A-MPDU length exponent extension subfield of an HE capabilities element,
wherein the third information corresponds to a maximum A-MPDU length exponent extension subfield of an EHT capabilities element, and
wherein the maximum length for the A-MPDU is a maximum length for the A-MPDU pre-end of frame (pre-EOF) padding.

9. A second station (STA) apparatus in a wireless local area network system, the apparatus comprising:
at least one transceiver; and
at least one processor connected to the at least one transceiver,
wherein the at least one processor is configured to:
receive, through the at least one transceiver from a first STA, first information, second information, and third information related to a maximum length for an aggregate-medium access control (MAC) protocol data unit (PDU) (A-MPDU); and
transmit, through the at least one transceiver to the first STA, in an extreme high throughput (EHT) physical layer PDU (PPDU), an A-MPDU having a length equal to or smaller than the maximum length for the A-MPDU calculated based on a value of the first information, a value of the second information, and a value of the third information,
wherein the first information corresponds to a maximum A-MPDU length exponent subfield of a very high throughput (VHT) capabilities element, or a maximum A-MPDU length exponent subfield of a high efficiency (HE) 6 GHz band capabilities element,
wherein the second information corresponds to a maximum A-MPDU length exponent extension subfield of an HE capabilities element,
wherein the third information corresponds to a maximum A-MPDU length exponent extension subfield of an EHT capabilities element, and
wherein the maximum length for the A-MPDU is a maximum length for the A-MPDU pre-end of frame (pre-EOF) padding.

* * * * *